United States Patent
Aitken

(10) Patent No.: US 11,168,671 B2
(45) Date of Patent: Nov. 9, 2021

(54) LIFT SYSTEM MOUNTABLE IN A NACELLE OF A WIND TURBINE

(71) Applicant: LiftWerx Holdings Inc., Cambridge (CA)

(72) Inventor: Glen D. Aitken, Fergus (CA)

(73) Assignee: LiftWerx Holdings Inc., Cambridge (CA)

( * ) Notice: Subject to any disclaimer, the term of this patent is extended or adjusted under 35 U.S.C. 154(b) by 0 days.

(21) Appl. No.: 16/642,169

(22) PCT Filed: Nov. 15, 2018

(86) PCT No.: PCT/CA2018/051449
§ 371 (c)(1),
(2) Date: Feb. 26, 2020

(87) PCT Pub. No.: WO2019/100146
PCT Pub. Date: May 31, 2019

(65) Prior Publication Data
US 2020/0378368 A1    Dec. 3, 2020

Related U.S. Application Data

(60) Provisional application No. 62/589,778, filed on Nov. 22, 2017.

(51) Int. Cl.
*F03D 80/50* (2016.01)
*F03D 13/10* (2016.01)
(Continued)

(52) U.S. Cl.
CPC .............. *F03D 80/50* (2016.05); *F03D 13/10* (2016.05); *B66C 23/207* (2013.01); *F03D 13/20* (2016.05);
(Continued)

(58) Field of Classification Search
CPC .......... F03D 13/10; F03D 13/20; F03D 80/50; F05B 2240/13; F05B 2230/61
See application file for complete search history.

(56) References Cited

U.S. PATENT DOCUMENTS

| | | |
|---|---|---|
| 7,397,145 B2 | 7/2008 | Struve et al. |
| 7,721,434 B2 | 5/2010 | Weaver et al. |

(Continued)

FOREIGN PATENT DOCUMENTS

| | | |
|---|---|---|
| CN | 201483408 U | 5/2010 |
| CN | 102491162 A | 6/2012 |

(Continued)

OTHER PUBLICATIONS

International Search Report and Written Opinion on PCT/CA2018/051449 dated Feb. 6, 2019.

(Continued)

*Primary Examiner* — Moshe Wilensky
(74) *Attorney, Agent, or Firm* — Brunet & Co. Ltd.; Robert Brunet; Hans Koenig

(57) ABSTRACT

A lift system mountable in a nacelle of a wind turbine has a mounting interface removably securable to a generator in the nacelle of the wind turbine, and a knuckle boom rotatably and removably mounted on the mounting interface. The knuckle boom has an extendable boom arm having a translatable boom section slidably mounted on the boom arm. Modularity of the lift system permits lifting components of the lift system up to the nacelle using an existing service crane of the wind turbine, and rapidly dismounting the knuckle boom to permit closing doors of the nacelle in the event of inclement weather without dismounting all of the lift system components.

17 Claims, 19 Drawing Sheets

(51) Int. Cl.
*F03D 13/20* (2016.01)
*B66C 23/20* (2006.01)

(52) U.S. Cl.
CPC ....... *F05B 2230/61* (2013.01); *F05B 2240/14* (2013.01)

(56) References Cited

U.S. PATENT DOCUMENTS

| | | | |
|---|---|---|---|
| 7,748,547 | B2 | 7/2010 | Llorente Gonzalez et al. |
| 8,108,997 | B2 | 2/2012 | Weaver et al. |
| 8,500,400 | B2 | 8/2013 | Signore et al. |
| 8,556,591 | B2 | 10/2013 | Koronkiewicz |
| 8,595,931 | B2 | 12/2013 | Riddell et al. |
| 8,636,488 | B2 | 1/2014 | Fenger |
| 8,827,648 | B2 | 9/2014 | Pedersen |
| 8,936,437 | B2 | 1/2015 | Holling et al. |
| 8,944,766 | B2 | 2/2015 | Nielsen et al. |
| 8,998,546 | B2 | 4/2015 | Fenger |
| 9,022,739 | B2 | 5/2015 | Krishnan et al. |
| 9,102,507 | B2 | 8/2015 | Willim |
| 9,115,693 | B2 | 8/2015 | Fenger |
| 9,120,652 | B2 | 9/2015 | Munk-Hansen |
| 9,359,911 | B2 | 6/2016 | Abolfazlian et al. |
| 9,394,880 | B2 | 7/2016 | Zuteck |
| 9,415,978 | B2 | 8/2016 | Fenger |
| 9,500,090 | B2 | 11/2016 | Hvid Nielsen |
| 9,527,554 | B2 | 12/2016 | Lee et al. |
| 9,638,163 | B2 | 5/2017 | Holloway et al. |
| 9,651,020 | B2 | 5/2017 | Holloway et al. |
| 9,670,898 | B2 | 6/2017 | Abolfazlian et al. |
| 9,821,985 | B2 | 11/2017 | Willim |
| 9,845,791 | B2 | 12/2017 | Fenger |
| 2005/0211653 | A1 | 9/2005 | Franzen |
| 2006/0120809 | A1 | 6/2006 | Ingram et al. |
| 2010/0139062 | A1 | 6/2010 | Reed et al. |
| 2011/0017695 | A1 | 1/2011 | Vandenbulcke et al. |
| 2011/0013548 | A1 | 6/2011 | Chen et al. |
| 2012/0141292 | A1 | 6/2012 | Signore et al. |
| 2013/0309090 | A1* | 11/2013 | Abolfazlian ............ F03D 9/255 416/1 |
| 2015/0013211 | A1 | 5/2015 | Schoenike |
| 2015/0300037 | A1 | 10/2015 | Pellerin |
| 2017/0045029 | A1 | 2/2017 | Senthoorpandian et al. |
| 2017/0050824 | A1 | 2/2017 | Fenger |
| 2017/0218915 | A1 | 8/2017 | Wilmot et al. |
| 2017/0306930 | A1 | 10/2017 | Fenger |

FOREIGN PATENT DOCUMENTS

| | | |
|---|---|---|
| CN | 105110206 A | 12/2015 |
| CN | 105271010 A | 1/2016 |
| CN | 105649893 A | 6/2016 |
| CN | 104843591 A | 8/2018 |
| DE | 102006013539 A1 | 9/2007 |
| DK | 201400573 A | 4/2016 |
| DK | 201400575 A | 4/2016 |
| EP | 1101934 A2 | 5/2001 |
| EP | 1617075 A1 | 1/2006 |
| EP | 1677006 A1 | 7/2006 |
| EP | 1677007 A1 | 7/2006 |
| EP | 2420670 A1 | 2/2012 |
| JP | H09142778 A | 6/1997 |
| WO | 2012/095112 A1 | 7/2012 |
| WO | 2012/107049 A1 | 8/2012 |
| WO | 2013/167138 A1 | 11/2013 |
| WO | 2014/082641 A1 | 6/2014 |
| WO | 2015/078475 A1 | 6/2015 |
| WO | 2016/055065 A1 | 4/2016 |
| WO | 2016/204626 A1 | 12/2016 |
| WO | 2017/092761 A1 | 6/2017 |
| WO | 2017/103139 A1 | 6/2017 |
| WO | 2018/046436 A1 | 3/2018 |
| WO | 2018/054440 A1 | 3/2018 |

OTHER PUBLICATIONS

Office Action on CA 3,012,945 dated Feb. 7, 2019.
Palfinger Brochure of Oct. 27, 2017.
PK40002EH Palfinger Knuckleboom Crane product description.

* cited by examiner

LIFT SYSTEM MOUNTABLE IN A NACELLE OF A WIND TURBINE

CROSS-REFERENCE TO RELATED APPLICATIONS

This application is a national entry of International Application PCT/CA2018/051449 filed Nov. 15, 2018, claims priority to Canadian patent application 3,012,945 filed Nov. 30, 2018 and claims the benefit of United States Provisional Patent Application U.S. Ser. No. 62/589,778 filed Nov. 22, 2017.

FIELD

This application relates to lift systems, especially to a lifting appliance mountable on wind turbines.

BACKGROUND

Wind turbines require periodic maintenance to remain operable. Due to the extreme height at which many wind turbines operate, maintaining and/or replacing turbine parts (e.g. a rotor, blade, main bearing, main shaft, intermediate shaft, gearbox, etc.) becomes problematic. For reasons of safety and practicality, turbine parts are generally lowered to ground level for maintenance and/or replacement. Typically, a crane is used to lower (and then re-raise) the parts to be maintained or replaced.

When replacing a damaged intermediate shaft ("IMS") from a wind turbine gearbox, current state-of-the-art procedure for removing the gearbox involves using a large conventional crane on the ground, which is a machine having a capacity of 300 tons and a boom length of 100 meters or more. The crane is used to remove the upper housing of the gearbox (weighing approximately 4 tons), after which the IMS is removed and replaced with the crane. This is a tricky procedure and potentially dangerous in high wind speeds.

There have been a number of cranes developed in the prior art specifically adapted for maintenance of gearboxes. However, prior art cranes generally suffer from a lack of sufficient lifting capacity, which prevents them from having the ability to remove the upper housing of the gearbox. Accordingly, the upper housing must be lifted using a separate gantry device which lifts the upper housing to allow the IMS to be subsequently lifted with a crane.

There remains a need for a turbine-mounted crane that is capable of lifting, moving and lowering an upper housing of a gearbox and/or gearbox components of a wind turbine, particularly the turbine IMS shaft, and which preferably can be rapidly dismounted to permit closing a nacelle atop a tower of the wind turbine.

SUMMARY

In one aspect, there is provided a lift system mountable in a nacelle of a wind turbine, the lift system comprising: a mounting interface removably securable to a generator in the nacelle of the wind turbine; and, a knuckle boom rotatably and removably mounted on the mounting interface, the knuckle boom comprising an extendable boom arm, the extendable boom arm comprising a translatable boom section slidably mounted on the boom arm.

In another aspect, there is provided a lift system mountable in a nacelle of a wind turbine, the lift system comprising: a mounting interface removably securable to a generator in the nacelle of the wind turbine, the mounting interface comprising a first plurality of through apertures; a swivel removably mounted on the mounting interface, the swivel comprising a second plurality of through apertures each concentrically aligned with one through aperture of the first plurality of through apertures when the swivel is mounted on the mounting interface, the swivel secured to the mounting interface by a plurality of non-threaded pins removably inserted through the concentrically aligned through apertures of the first and second plurality of through apertures, the removable non-threaded pin permitting mounting of the swivel on and dismounting of the swivel from the mounting interface; a knuckle boom rotatably mounted on the swivel, the knuckle boom rotatable on the swivel about a vertical axis, the knuckle boom comprising an extendable boom arm, the extendable boom arm comprising a translatable boom section slidably mounted on the boom arm; a power pack mounted on the mounting interface, the power pack comprising an electric motor and a hydraulic pump, the power pack not extending beyond a maximum height to permit closing the nacelle when the mounting interface is mounted on the generator and the knuckle boom is dismounted from the mounting interface; and, a hydraulic motor for operating the swivel, the hydraulic motor connectable to the hydraulic pump by hydraulic lines and quick connect hydraulic fittings.

In another aspect, there is provided a method of mounting a lift system in a nacelle on top of a standing wind turbine, the method comprising: lifting a mounting interface of the lift system with a power pack and a swivel mounted thereon up to the nacelle using an existing service crane permanently mounted in the nacelle of the wind turbine, the swivel having a hydraulic motor mounted thereon for operating the swivel, the power pack comprising a hydraulic pump for powering the hydraulic motor and an electric motor for powering the hydraulic pump, the mounting interface comprising a hydraulic fluid reservoir for providing hydraulic fluid to the hydraulic pump; mounting the mounting interface on a generator in the nacelle; lifting a knuckle boom using the service crane, and mounting the knuckle boom on the swivel; lifting a chain bag of the knuckle boom using the service crane, and mounting the chain bag to the knuckle boom; lifting a support bracket of the lift system with a control unit thereon using the service crane, and mounting the support bracket on the mounting interface; and, connecting the control unit to the electric motor in the power pack.

In an embodiment, the lift system may further comprise a swivel removably mounted on the mounting interface. The knuckle boom may be rigidly mounted on the swivel. The swivel may be rotatable to rotate the knuckle boom mounted thereon about a vertical axis.

The swivel may comprise a rotatable portion on which the knuckle boom is mounted. The swivel may comprise a fixed portion comprising a first through aperture. The mounting interface may comprise a second through aperture concentrically aligned with the first through aperture when the swivel is mounted on the mounting interface. The swivel may be secured to the mounting interface by a non-threaded pin removably inserted through the first and second through apertures. The removable non-threaded pin permits mounting of the swivel on and dismounting of the swivel from the mounting interface. The the first through aperture, the second through aperture and the removable non-threaded pin may comprise a plurality of (for example four) first through apertures, second through apertures and removable non-threaded pins.

The mounting interface may further comprise a third through aperture through which a support pin may be inserted. The swivel may comprise a support surface having an indent in which the support pin is engaged so that the swivel rests on the support pin when the swivel is mounted on the mounting interface. The third through aperture and the support pin may comprise a plurality of (for example four) third through apertures and support pins.

The mounting interface may comprise clamps that engage protruding elements of the generator to securely and removably mount the mounting interface on a top of the generator. The clamps may comprise hooking portions that engage the protruding elements. The clamps may comprise bolts for tightening the clamps on the generator.

In an embodiment, the lift system may further comprise a hydraulic motor for operating the swivel. The hydraulic motor may be mounted on the swivel or on the mounting interface, preferably on the swivel.

In an embodiment, the lift system may further comprise a power pack mounted on the mounting interface. The power pack may comprise a hydraulic pump and an electric motor to power the hydraulic pump. The hydraulic pump may be fluidly connected to the hydraulic motor to power the hydraulic motor. The hydraulic pump may be connectable to the hydraulic motor through hydraulic lines and hydraulic fittings. The hydraulic fittings are preferably quick connect hydraulic fittings. The hydraulic pump may be fluidly connected to a hydraulic manifold, the hydraulic manifold fluidly connected to the hydraulic motor and to hydraulically operated components (e.g. hydraulic cylinders) of the knuckle boom. The hydraulic pump may be fluidly connected to one or more hydraulic fluid reservoirs to receive hydraulic fluid for powering the hydraulic motor and the hydraulically operated components of the knuckle boom. The mounting interface may comprise the one or more hydraulic fluid reservoirs. The one or more hydraulic fluid reservoirs may be one or more hollow side rails of the mounting interface in fluid communication with the hydraulic pump mounted on the mounting interface. The power pack mounted on the mounting interface preferably does not extend beyond a maximum height so that the nacelle may be closed when the mounting interface remains mounted on the generator and the knuckle boom is dismounted from the mounting interface. Doors of the nacelle may be completely closed when the knuckle boom is dismounted and the mounting interface remains mounted on the generator.

In an embodiment, the lift system may further comprise a support bracket removably mounted on the mounting interface, the support bracket adapted to securely support a control unit thereon. The support bracket and the mounting interface may comprise mated through apertures that receive removable mounting pins to mount the support bracket on the mounting interface.

The lift system is modular. The modularity of the lift system permits lifting components of the lift system up to the nacelle using the existing service crane of the wind turbine, and rapidly dismounting the knuckle boom to permit closing doors of the nacelle in the event of inclement weather without dismounting all of the lift system components from the nacelle. The lift system is capable of lifting heavier loads than the existing service cranes in the nacelles of commercial wind turbines. For example, the lift system is capable of lifting an upper housing of a gearbox of a commercial wind turbine.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
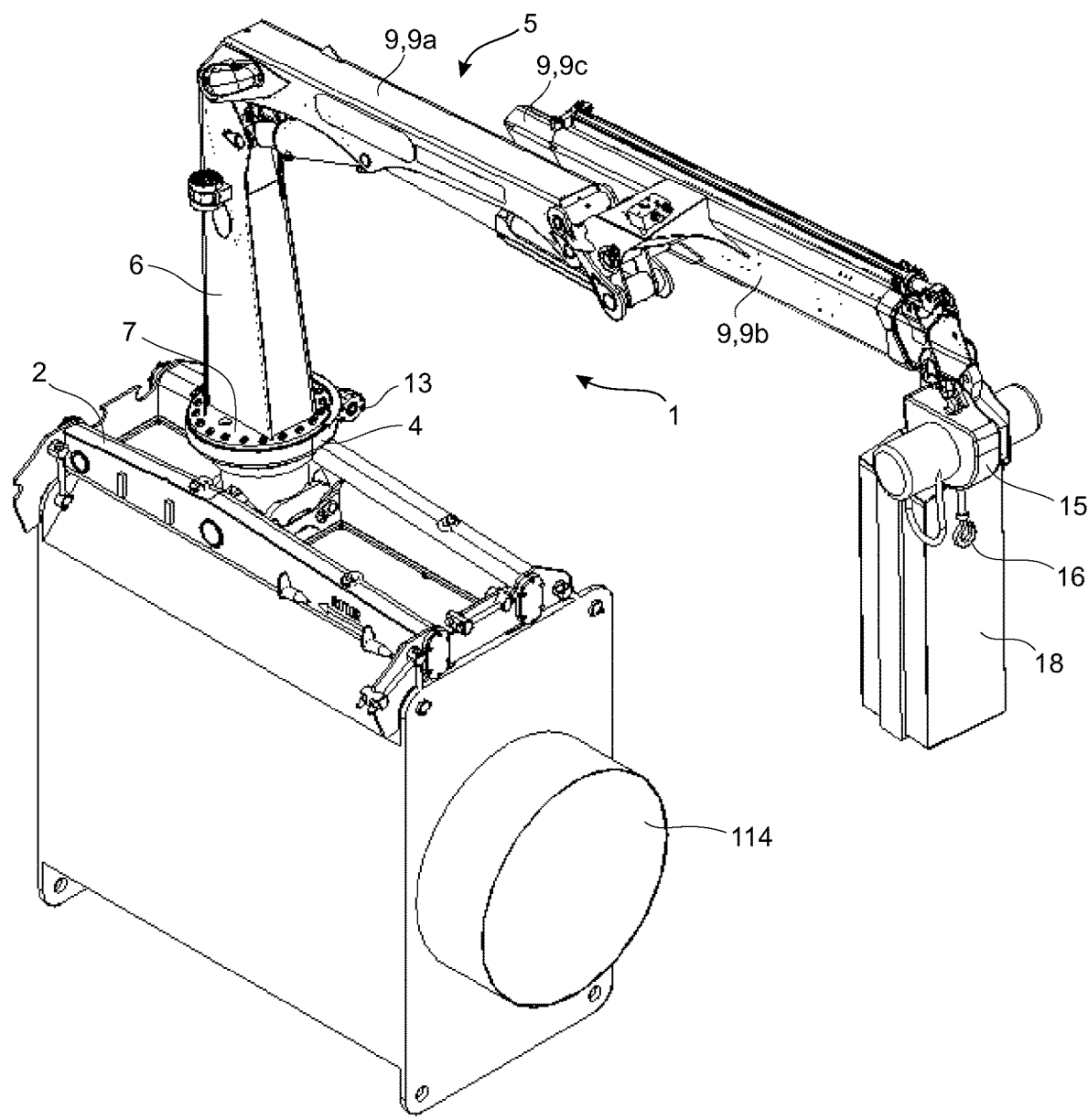
FIG. 1 depicts a rear perspective view of a lift system mounted on a generator of a wind turbine.
Figure 2:
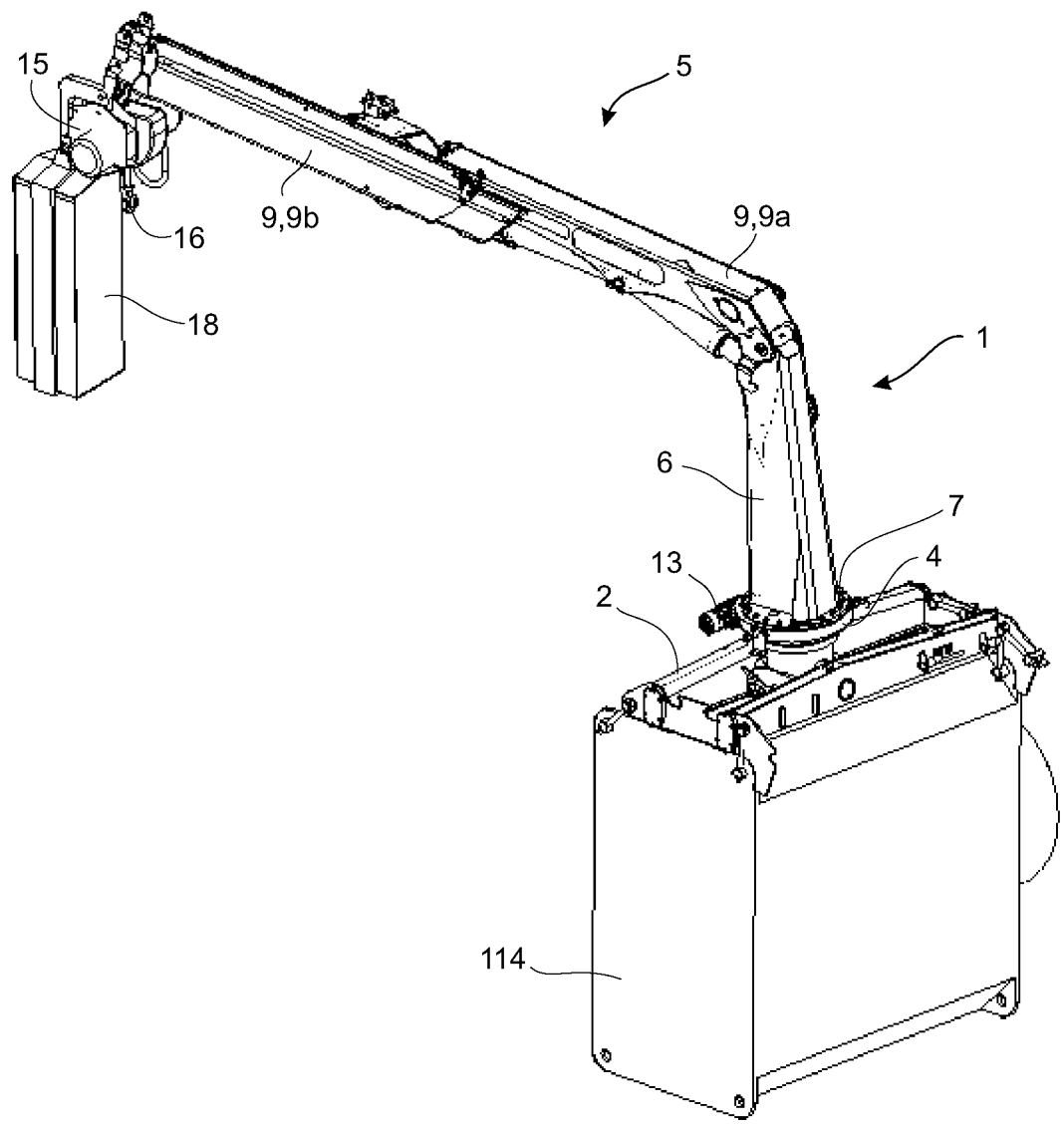
FIG. 2 depicts a front perspective view of the lift system of FIG. 1 mounted on the generator showing a knuckle boom of the lift system swiveled into a different position.
Figure 3:
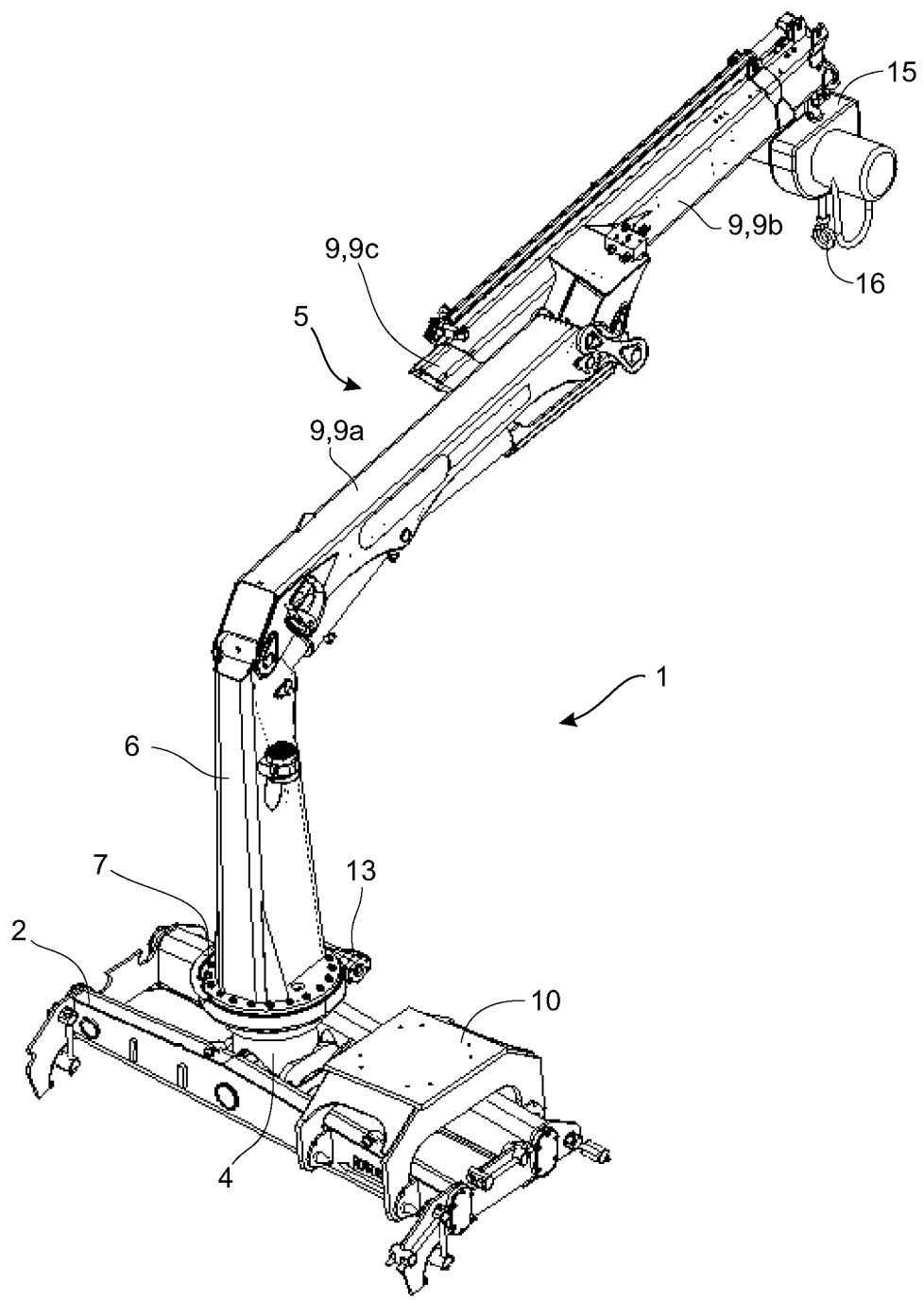
FIG. 3 depicts a rear perspective view of the lift system of FIG. 1 without showing the generator.
Figure 4:
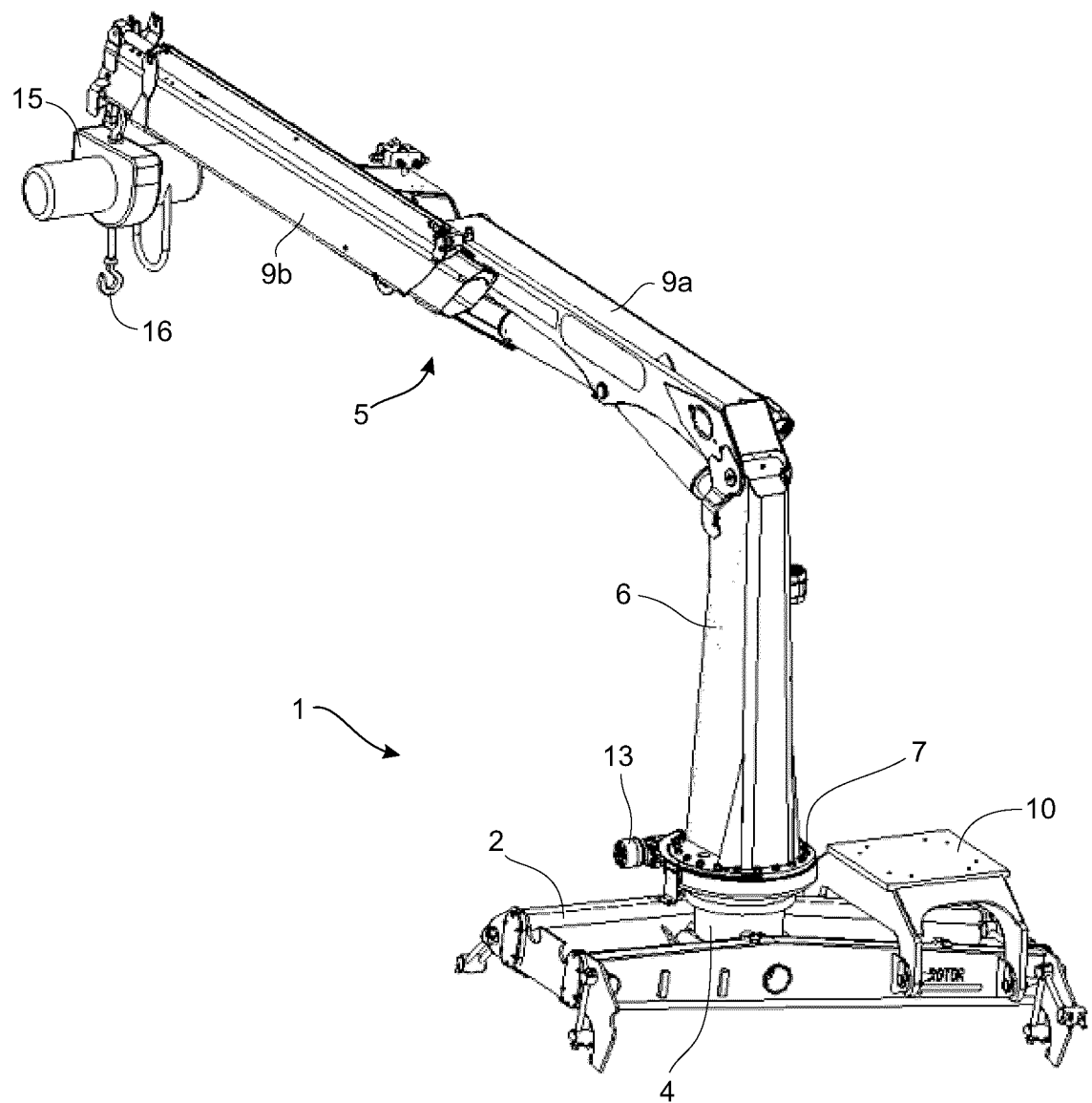
FIG. 4 depicts another perspective view of the lift system of FIG. 3 showing a knuckle boom of the lift system swiveled into a different position.

With reference to the Figures, a lift system 1 is particularly useful for lifting and lowering a gearbox 110 or components of the gearbox 110 (e.g. an intermediate speed (IMS) shaft 112) in a nacelle 100 of a standing wind turbine. Although the lift system 1 is particularly useful for lifting and lowering components of a gearbox, the lift system 1 may also be used to lift and lower other components of the wind turbine. The lift system 1 is configured to be mounted on top of a generator 114 in the nacelle 100.

The lift system 1 comprises a knuckle boom 5 rigidly mounted on a swivel 4. The knuckle boom 5 comprises an articulated boom arm 9, having three sections 9a, 9b, 9c, pivotally attached to a pedestal 6, the pedestal 6 having a base plate 7 rigidly mounted to the swivel 4. The swivel 4 is mounted on a mounting interface 2, the mounting interface 2 mounted on a top of the generator 114. A chain hoist 15 is disposed proximate a distal end of the knuckle boom 5, the hoist 15 operable to raise and lower an object (e.g. the intermediate speed (IMS) shaft 112) connected to a hook 16 of the hoist 15 with a fixed sling. The chain hoist 15 hanging from the distal end of the knuckle boom 5 contains a cable or chain, which winds and unwinds when the objected is lifted and lowered. A chain bag 18 hanging beside the hoist 15 contains a sufficient length of chain to permit the hoist 15 to lower objects to the ground from the top of the wind turbine. The lift system 1 further comprises a hydraulic motor 13 mounted on the swivel 4 and a power pack mounted on the mounting interface 2. The power pack comprises an electric motor 14 and a hydraulic pump 12, the electric motor 14 operating the hydraulic pump 12 (see FIG. 20). The hydraulic pump 12 pumps hydraulic fluid to power the hydraulic motor 13, and to power hydraulic components (e.g. hydraulic cylinders) of the knuckle boom 5 as well as to power the hoist 15. The hoist 15 may be powered directly by the electric motor 14, if desired. The electric motor 14 may receive power from the generator 114 through electrical connections to the power pack. If desired, the lifting system 1 may further comprise a support bracket 10 mounted on the mounting interface 2 and configured to rigidly but removably support a control unit 11 thereon. The control unit 11 may include a transformer, and can be used to adapt mains power of the generator 114 to an operating voltage of the electric motor 14. The electric motor 14 may be situated under the support bracket 10, and the power pack including the electric motor 14 and the hydraulic pump 12 do not extend significantly above the height of the mounting interface 2.

The mounting interface 2 serves as an interface between the generator 114 and the other components of the lift system 1 in order to support the lift system 1 on the generator 114. The mounting interface 2 comprises a pair of spaced-apart substantially parallel side rails 21, individually identified as a first side rail 21a and a second side rail 21b, connected by a pair of spaced apart end brackets 22, individually identified as a front-end bracket 22a and a rear-end bracket 22b, located at or proximate front and rear ends of the side rails 21. The side rails 21 may be connected to the end brackets 22 by virtue of being integrally formed from the same piece of material (e.g. steel), by welding the side rails 20 to the end brackets 22, or by using connectors, for example bolts. The side rails 21 together with the end brackets 22 form a quadrilateral, for example a rectangle. The front ends of the side rails 21 are closer to a rotor of the wind turbine than the rear ends of the side rails 21 when the mounting interface 2 is mounted on the generator 114.

Figure 9:
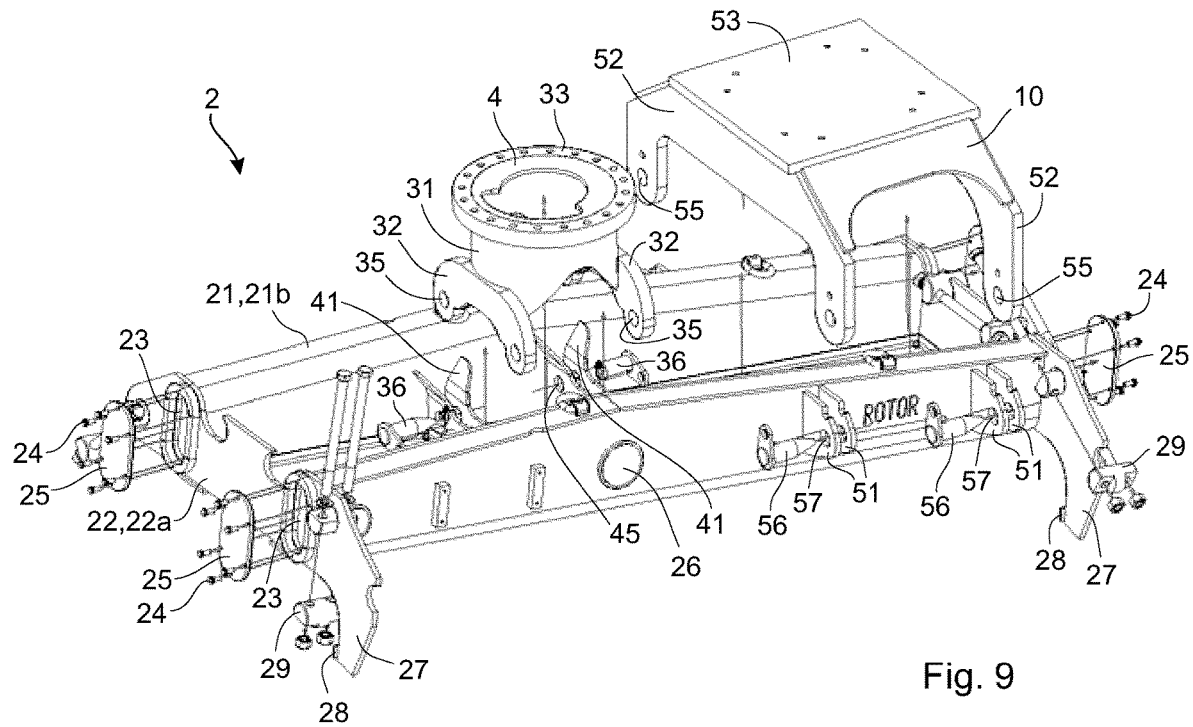
FIG. 9 depicts an exploded front perspective view of the mounting interface of FIG. 5.

The side rails 21 are hollow, having interior cavities 23 (see FIG. 9 and FIG. 10) in which hydraulic fluid may be stored to provide a hydraulic fluid reservoir for operating the hydraulic components of the lift system 1. The ends of the side rails 21 may be permanently closed, or may have openings, which are covered and sealed by cover plates 25 (see FIG. 9 and FIG. 10, only one labeled) secured to the ends by bolts 24 (see FIG. 9 and FIG. 10, only one labeled). The open ends of the side rails 21 permit filling, emptying and cleaning of the interior cavities 23. Access holes 26 through the side rails 21 permit hydraulic hoses to pass from under the knuckle boom 5 to a hydraulic manifold. Hydraulic fluid ports (not shown) on inner sides of the side rails 21 permit the installation of hose fittings to fluidly connect the hydraulic fluid reservoirs to the hydraulic pump 12 (see FIG. 20).

Figure 5:
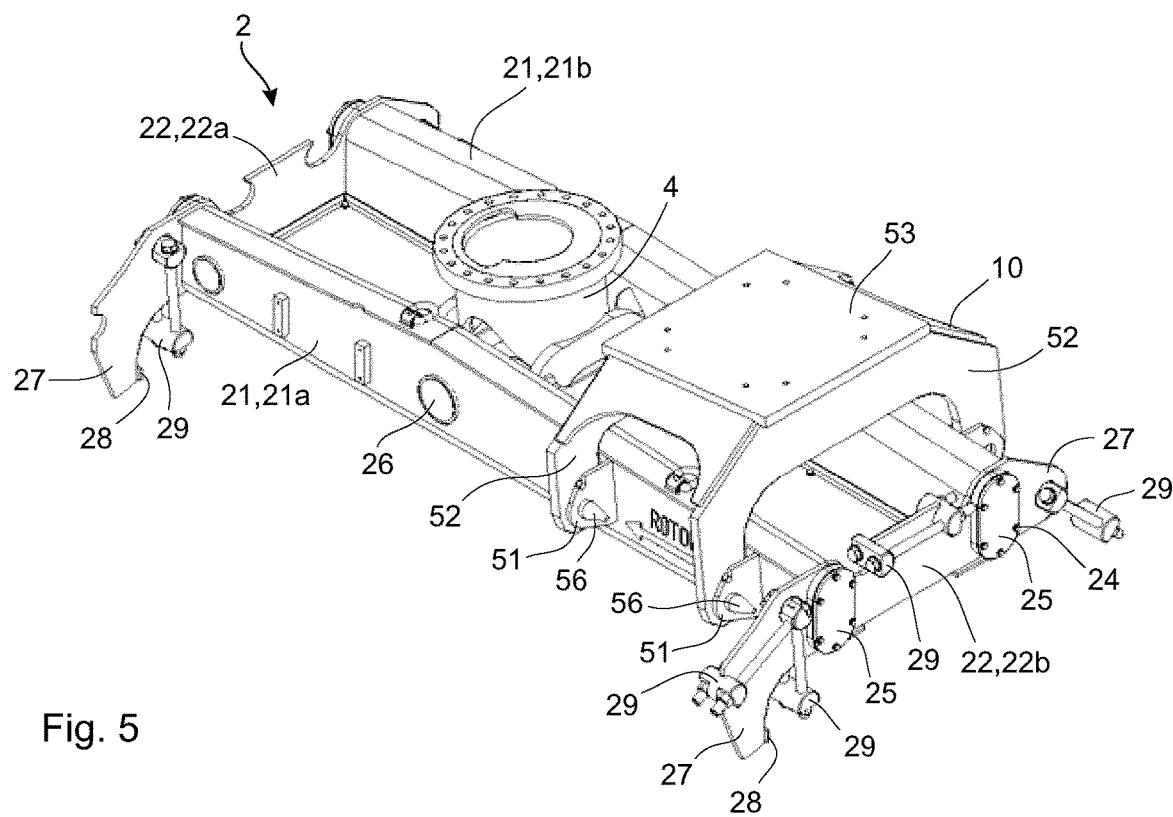
FIG. 5 depicts a rear perspective view of a mounting interface of the lift system of FIG. 1.
Figure 6:
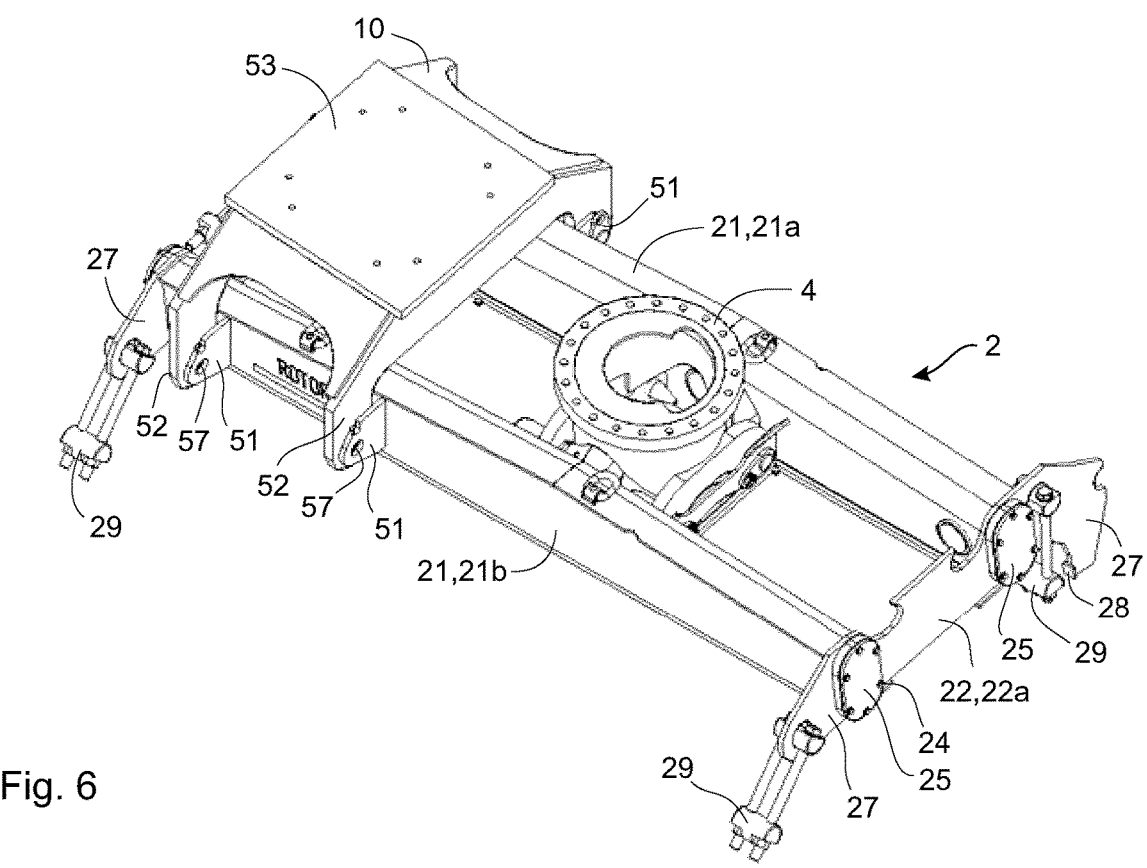
FIG. 6 depicts a front perspective view of the mounting interface of FIG. 5.
Figure 7:
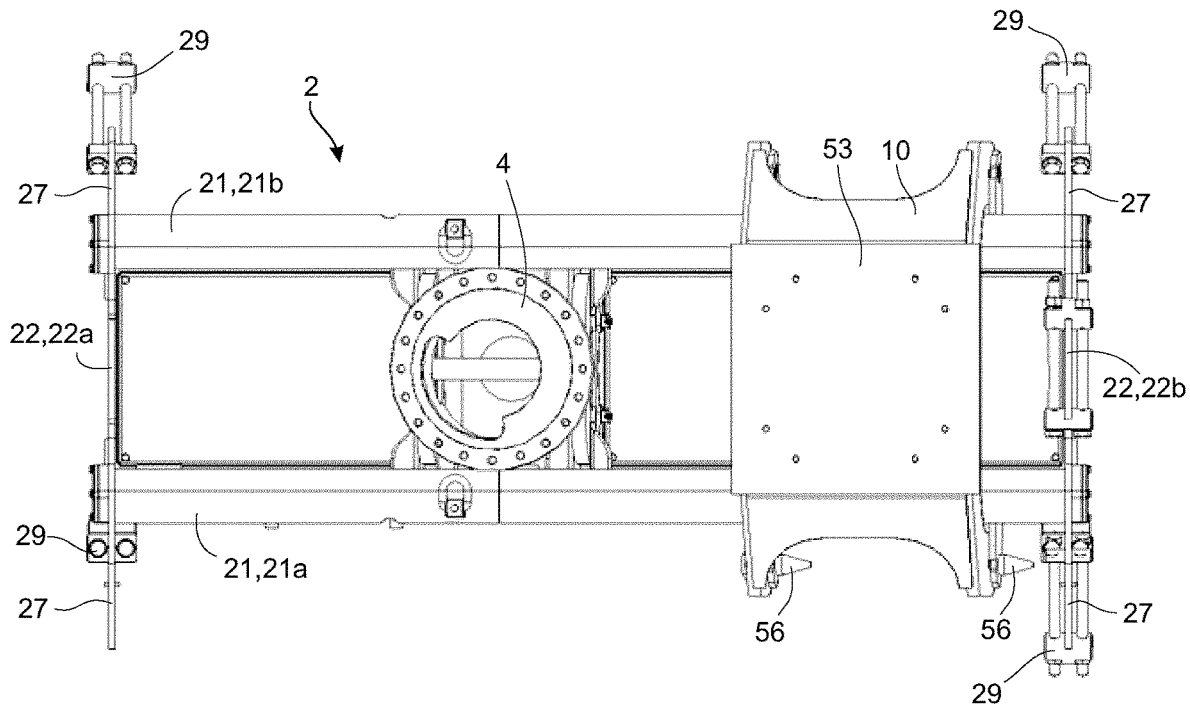
FIG. 7 depicts a top view of the mounting interface of FIG. 5.
Figure 10:
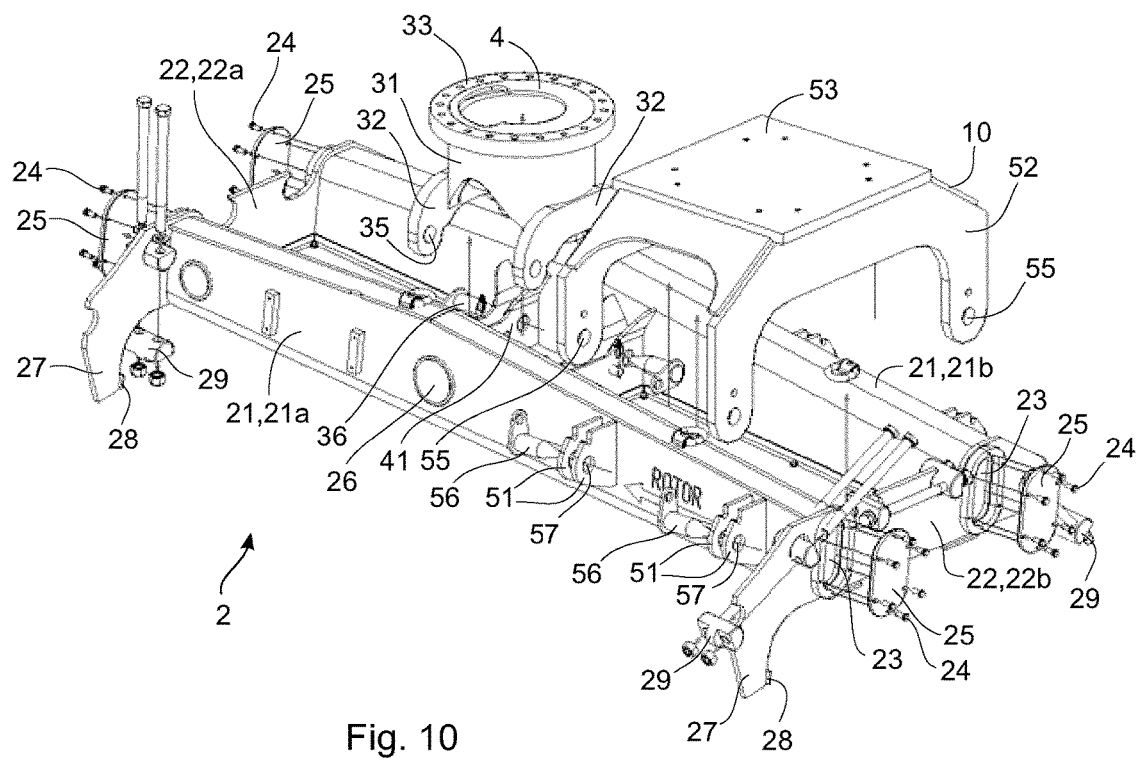
FIG. 10 depicts a rear perspective view of the exploded view of FIG. 9.
Figure 11:
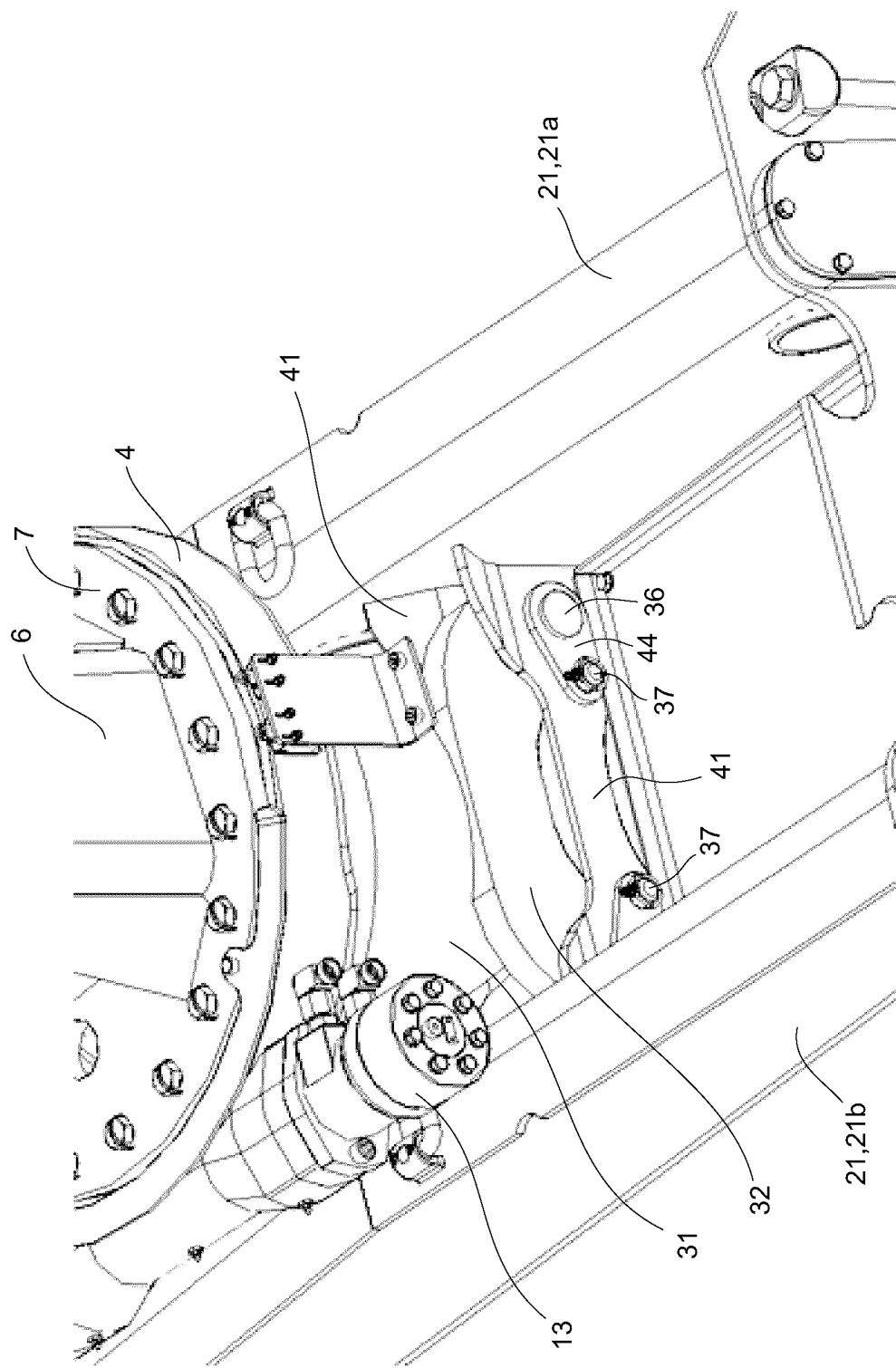
FIG. 11 depicts a magnified top front perspective view showing a swivel mounted on the mounting interface of FIG. 5.

With specific reference to FIG. 5 and FIG. 10, the end brackets 22 of the mounting interface 2 comprise middle sections transversely extending between and connected to the side rails 20, and pairs of feet 27 generally vertically oriented and perpendicular to both the middle section and the side rails 20. One or more of the feet 27 comprise hooking portions 28 that protrude from the feet 27 proximate bottoms of the feet 27, and bolting assemblies 29. The hooking portions 28 engage appropriate structures on the generator 114, while the bolting assemblies 29 engage protruding portions of the generator 114 to secure the mounting interface 2 on the generator 114 with the hooking portions 28 tightly engaging the appropriate structures on the generator 114 when bolts of the bolting assemblies 29 are tightened. Together, the hooking portions 28 and the bolting assemblies 29 act as clamps to clamp the mounting interface 2 on the generator 114.

The mounting interface 2 further comprises two sets of swivel mounting flanges 41 extending inwardly between the side rails 20, the swivel mounting flanges 41 providing structure to which the swivel 4 is mounted, as described further below. The mounting interface 2 further comprises two sets of support bracket mounting flanges 51 protruding outwardly from sides of the side rails 20, the support bracket mounting flanges 51 providing structure to which the support bracket 10 is mounted, as described further below.

Figure 8:
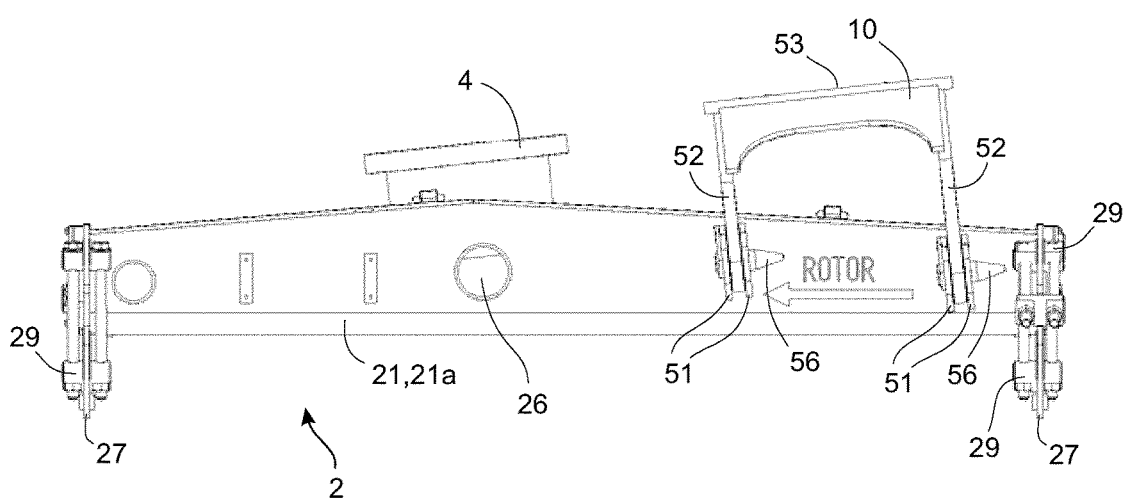
FIG. 8 depicts a side view of the mounting interface of FIG. 5.

With specific reference to FIG. 1 and FIG. 8, when the side rails 20 of the mounting interface 2 are substantially parallel to the ground, top surfaces of the swivel 4 and the support bracket 10 are angled with respect to the ground. However, when mounted on the top of the generator 114, the mounting interface 2 is angled rearwardly downward, which results in the top surfaces of the swivel 4 and the support bracket 10 being substantially parallel to the ground.

With specific reference to FIG. 9 to FIG. 14, the swivel 4 comprises a rotating portion 33 having an upper surface on which the base plate 7 of the pedestal 6 is bolted. The rotating portion 33 is operatively connected to the hydraulic motor 13, which provides power for rotating the rotating portion 33, and therefore the knuckle boom 5, through 360° about a vertical axis in a plane parallel to the ground. The swivel further comprises a fixed swivel body 31 in which the rotating portion 33 rotates. The swivel body 31 comprises a pair of spaced-apart arcuate mounting arms 32. Ends of the mounting arms 32 have through apertures 35 for receiving removable non-threaded mounting pins 36 therethrough. When the swivel 4 is in a mounted position on the mounting interface 2, each mounting arm 32 is engaged between the swivel mounting flanges 41 of one of the sets of the swivel mounting flanges 41. Each set of the swivel mounting flanges 41 comprises two spaced apart swivel mounting flanges 41, each swivel mounting flange 41 in a set comprising first through apertures 45 at both ends of the swivel mounting flange 41, which align with similar first through apertures 45 at the ends of the other swivel mounting flange 41 in the set. The two sets of swivel mounting flanges 41 are spaced apart at a distance such that one mounting arm 32 of the swivel 4 may slide between the swivel mounting flanges 41 of one set, while the other mounting arm 32 of the swivel 4 may slide between the swivel mounting flanges 41 of the other set. When the swivel 4 is in the mounted position, the through apertures 35 in the mounting arms 32 align with the first through apertures 45 in the swivel mounting flanges 41, and the mounting pins 36 may be inserted through the aligned apertures to secure the swivel 4 on the mounting interface 2.

Figure 12:
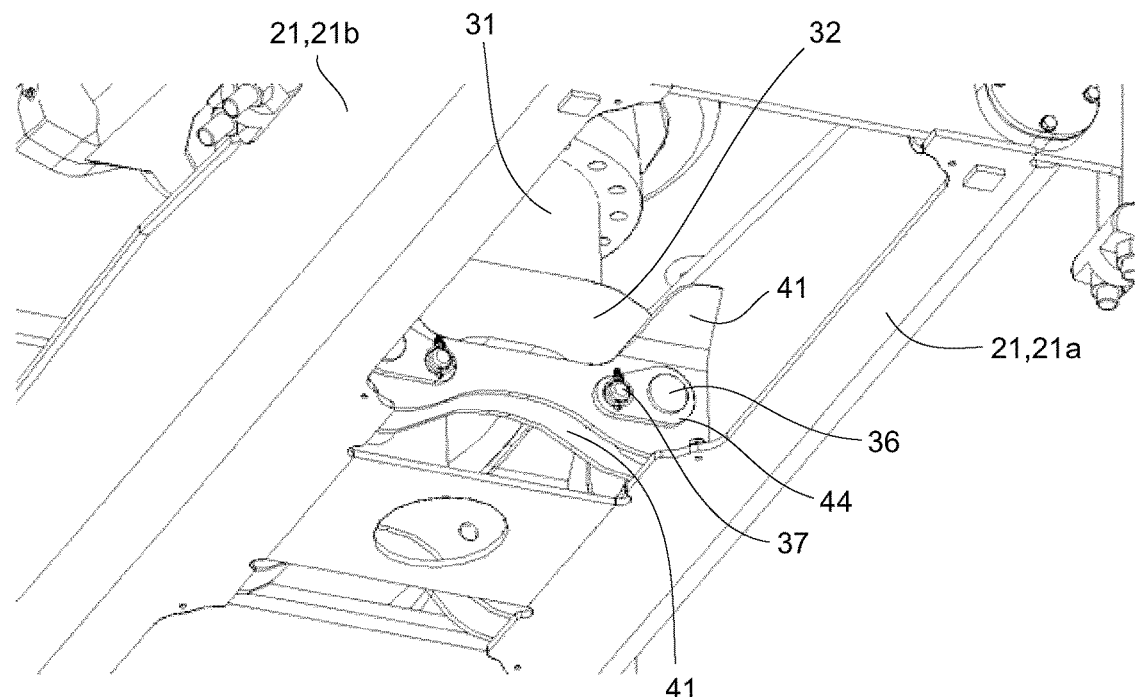
FIG. 12 depicts a bottom front perspective view FIG. 10.
Figure 13:
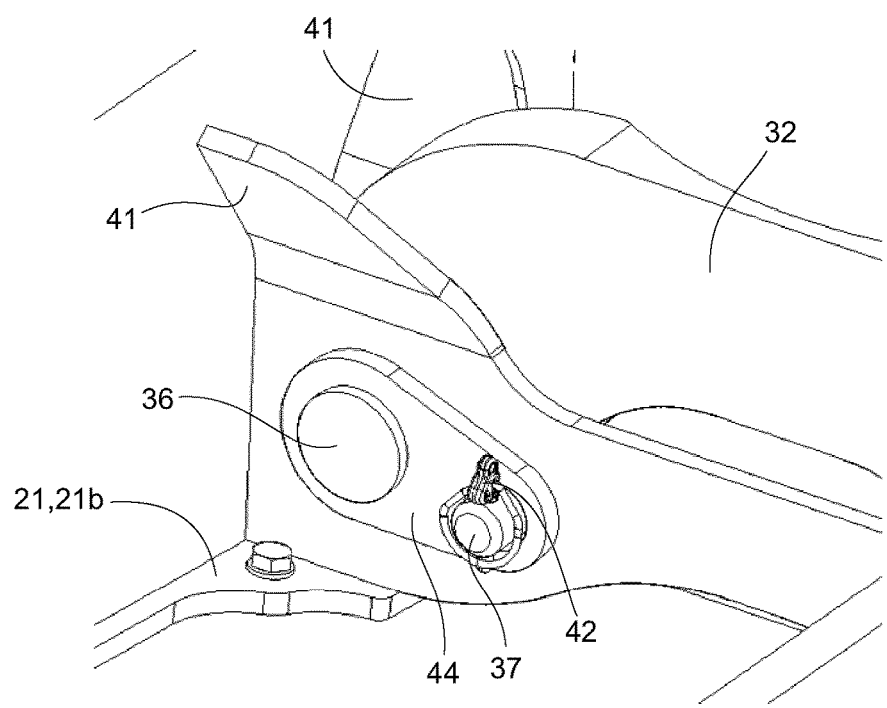
FIG. 13 depicts a magnified outside view of a pin arrangement for mounting the swivel on the interface.
Figure 14:
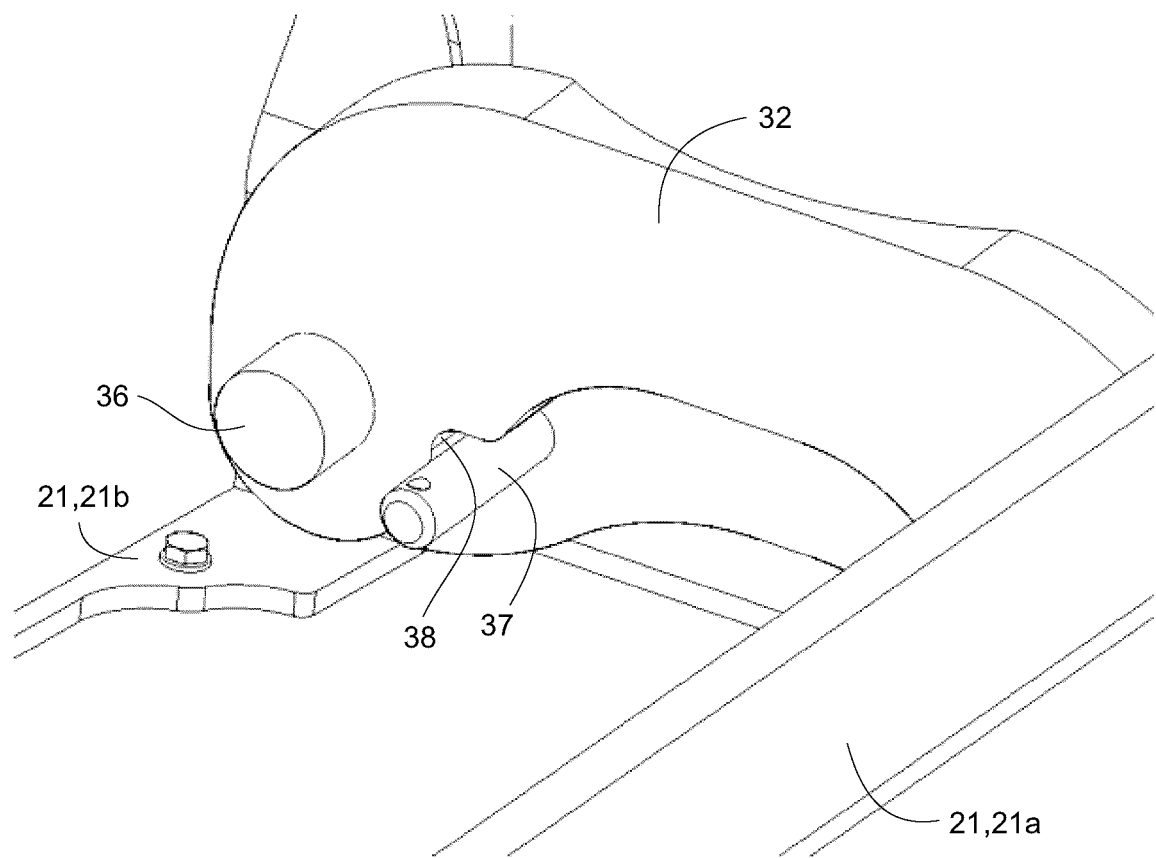
FIG. 14 depicts a magnified inside view of a pin arrangement for mounting the swivel on the interface.

Further support and security for the swivel 4 on the mounting interface 2 are provided by support pins 37 on which the mounting arms 32 rest when the swivel 4 is in the mounted position (see FIG. 12, FIG. 13 and FIG. 14). Proximate the ends and on bottom edges of the mounting arms 32, the mounting arms 32 comprise indents 38 shaped and positioned so that the mounting arms 32 rest on the support pins 37. The support pins 37 are inserted through second through apertures 42 at the ends of the swivel mounting flanges 41 and secured in place with cotter pins 43. Aperture-containing brace plates 44 at the ends of each swivel mounting flange 41 may help provide structural support around the first and second through apertures in the swivel mounting flanges 41. The support pins 37 firmly lock the swivel 4 to the interface 2 when the swivel 4 is operated to rotate the knuckle boom 5.

Figure 15:
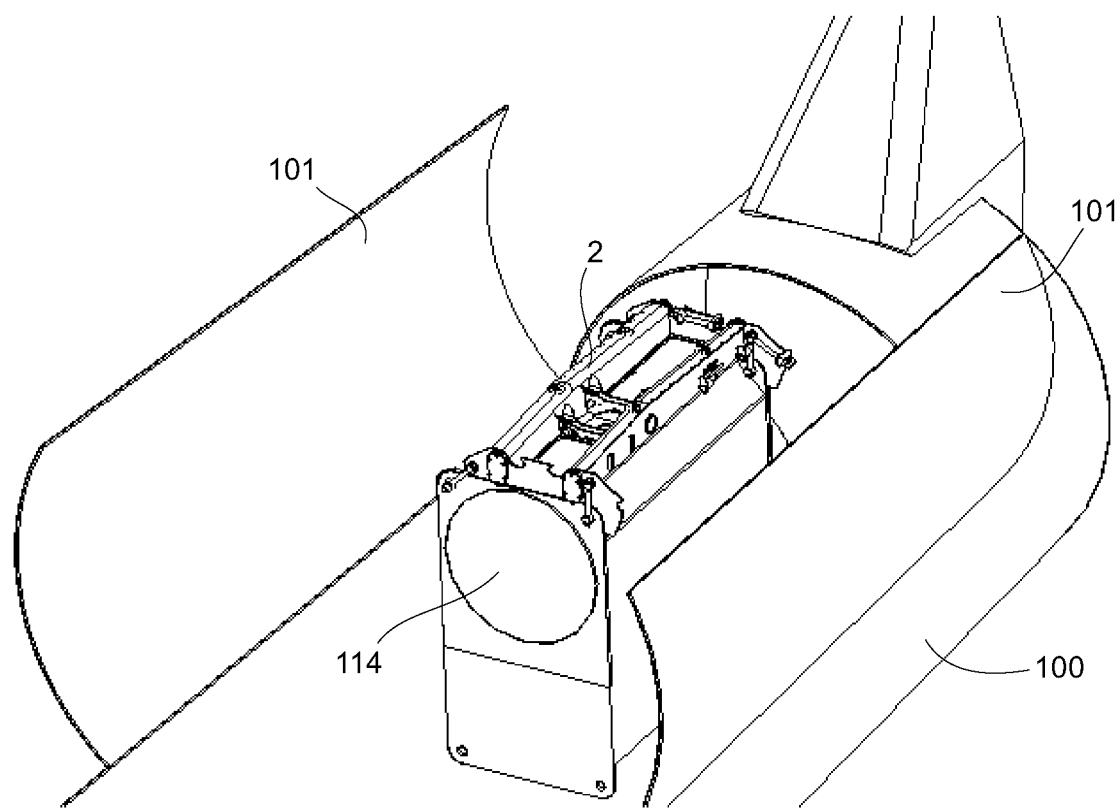
FIG. 15 depicts a front perspective view of the mounting interface of the lift system of FIG. 1 mounted on the generator, the generator mounted inside an open nacelle of the wind turbine.
Figure 16:
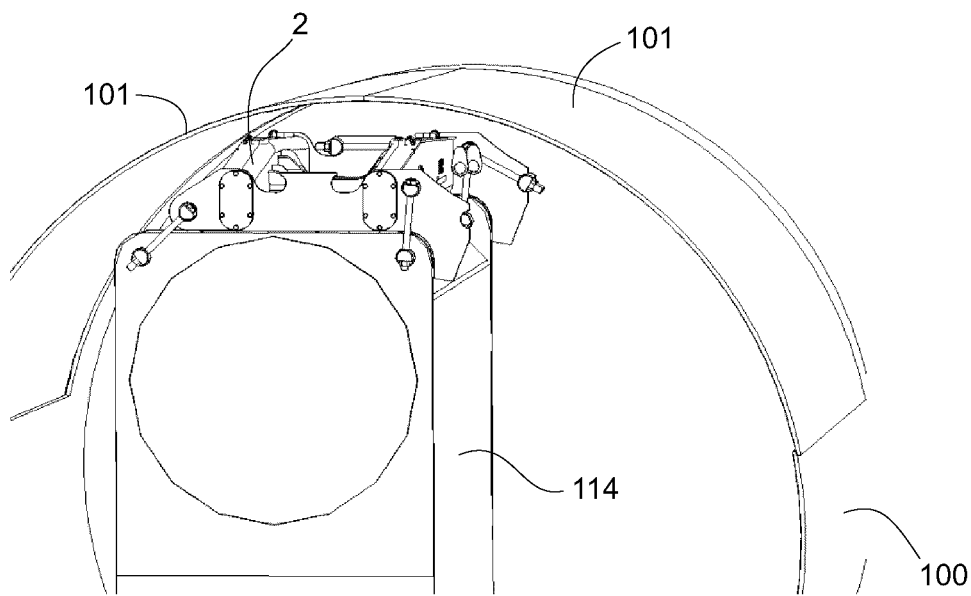
FIG. 16 depicts a front perspective view of the inside of the nacelle shown in FIG. 15 with the nacelle closed.

The removable pin arrangement for mounting the swivel 4 on the mounting interface 2 permits rapid mounting and dismounting of the knuckle boom 5 from the mounting interface 2. To rapidly dismount the knuckle boom 5, hydraulic lines 17 (see FIG. 19) between the hydraulic pump 12 and the hydraulic motor 13 may be disconnected from quick connect hydraulic fittings on the hydraulic motor 13, and the four removable mounting pins 36 may be removed. The knuckle boom 5 together with the swivel 4 may then be lifted off the mounting interface 2 and lowered to the ground by an existing service crane mounted in the nacelle 100. The existing service crane is generally a crane rated as being able to lift a maximum of 1000 kg when equipped with a heavier chain hoist. The existing service cranes that are typically provided with wind turbines fold down into a compact space within the nacelle 100 so that the nacelle 100 can be normally closed. However, the existing service cranes are insufficient for lifting heavier components of the wind turbine (e.g. gearbox components which weigh about 4 tons), hence the need for the lift system 1. The existing service crane is normally mounted in the nacelle 100 at a different location than the mounting interface 2, so that both the existing service crane and the lift system 1 can co-exist in the nacelle 100. Clamshell doors 101 of the nacelle 100 may be closed while the mounting interface 2 (with the power pack) remains mounted on the generator 114 (see FIG. 15 and FIG. 16). The dismounting operation may take as little as about 30-60 minutes. Remounting the knuckle boom 5 together with the swivel 4 may be quickly accomplished by reversing the steps.

While the removable pin arrangement is desirable for rapid dismounting/remounting of the knuckle boom 5, the knuckle boom 5 could be dismounted from the swivel 4 by removing all of the bolts attaching the base plate 7 to the swivel 4. The knuckle boom 5 is then be lowered to the ground, but the swivel 4 may be dismounted from the mounting interface 2 and moved to a different location inside the nacelle 100 in order to close the clamshell doors 101. However, removing and replacing all of the bolts attaching the base plate 7 to the swivel 4 requires much more time, and is therefore less desirable in an emergency situation. Further, while not desirable, the swivel 4 could be mounted to the mounting interface 2 by threaded bolts or other connectors that require considerably more time to remove and replace than the removable pin arrangement described above.

Figure 17:
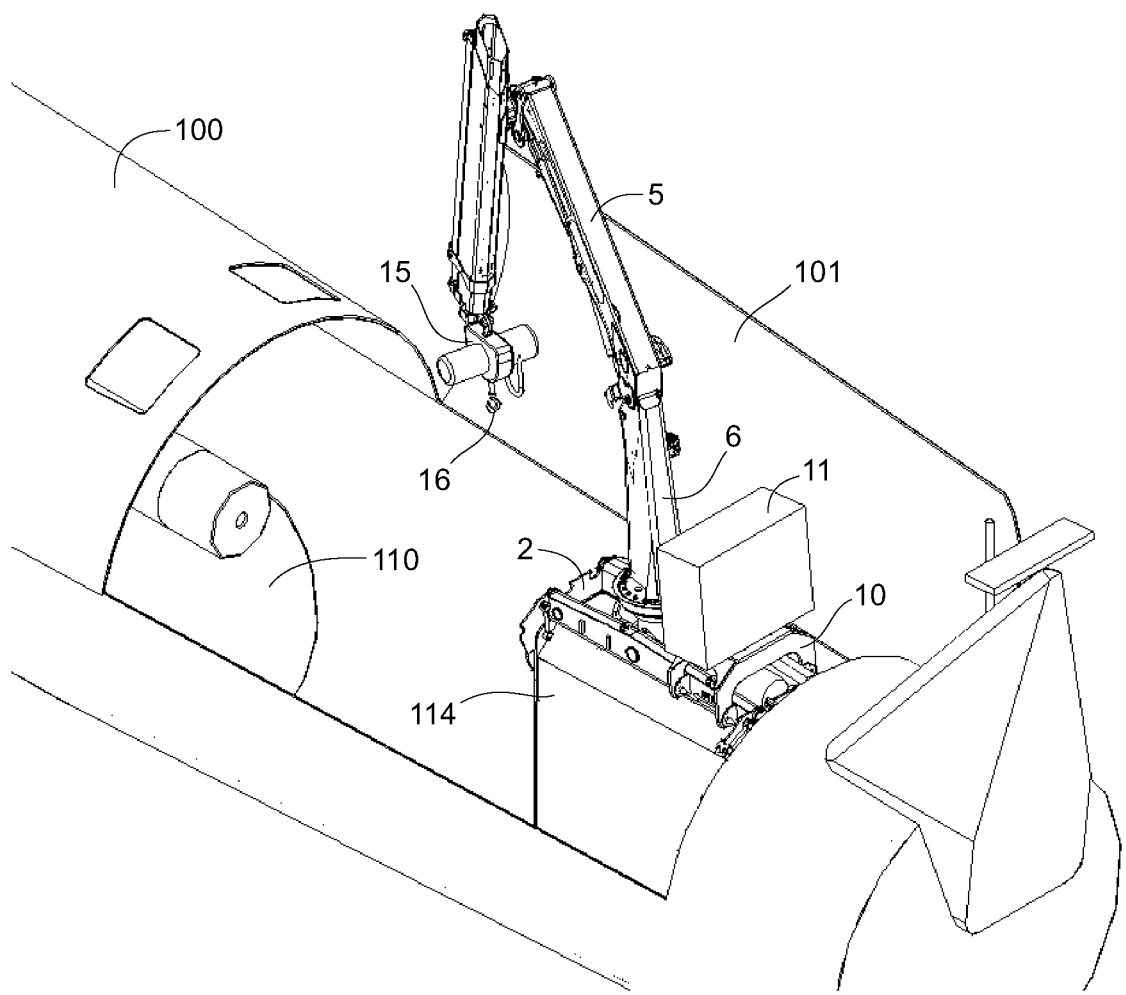
FIG. 17 depicts a rear perspective view of the lift system mounted on the generator in the open nacelle of the wind turbine.

With specific reference to FIG. 5 to FIG. 10, the support bracket 10 comprises a top plate 53 attached to a pair of spaced-apart arcuate mounting legs 52. Ends of the mounting legs 52 have through apertures 55 for receiving removable non-threaded mounting pins 56 therethrough. When the support bracket 10 is in a mounted position on the mounting interface 2, each mounting leg 52 is engaged between the support bracket mounting flanges 51 of one of the sets of the support bracket mounting flanges 51. Each set of the support bracket mounting flanges 51 comprises two spaced apart support bracket mounting flanges 51, each support bracket mounting flange 51 in a set comprising through apertures 57, which align with similar through apertures 57 of the other support bracket mounting flange 51 in the set. The two sets of support bracket mounting flanges 51 are spaced apart at a distance such that one mounting leg 52 of the support bracket 10 may slide between the support bracket mounting flanges 51 of one set, while the other mounting leg 52 of the support bracket 10 may slide between the support bracket mounting flanges 51 of the other set. When the support bracket 10 is in the mounted position, the through apertures 55 in the mounting legs 52 align with the through apertures 57 in the support bracket mounting flanges 51, and the mounting pins 56 may be inserted through the aligned apertures to secure the support bracket 10 on the mounting interface 2. The top plate 53 of the support bracket 10 provides a horizontal surface on which the control unit 11 may be securely mounted (see FIG. 17 and FIG. 18).

The removable pin arrangement for mounting the support bracket 10 on the mounting interface 2 permits rapid mounting and dismounting of the support bracket 10 with the control unit 11 thereon. To rapidly dismount the support bracket 10, quick connect electrical fittings for electrical lines (not shown) between the power pack and the control unit 11 may be disconnected, and the four removable mounting pins 56 may be removed. The support bracket 10 together with the control unit 11 may then be lifted off the mounting interface 2 and lowered to the ground by an existing service crane mounted in the nacelle 100. The clamshell doors 101 of the nacelle 100 may be closed while the mounting interface 2 (with the power pack) remains mounted on the generator 114 (see FIG. 15 and FIG. 16). The dismounting operation may take as little as about 30-60 minutes. Remounting the support bracket 10 with the control unit 11 thereon may be quickly accomplished by reversing the steps.

Figure 18:
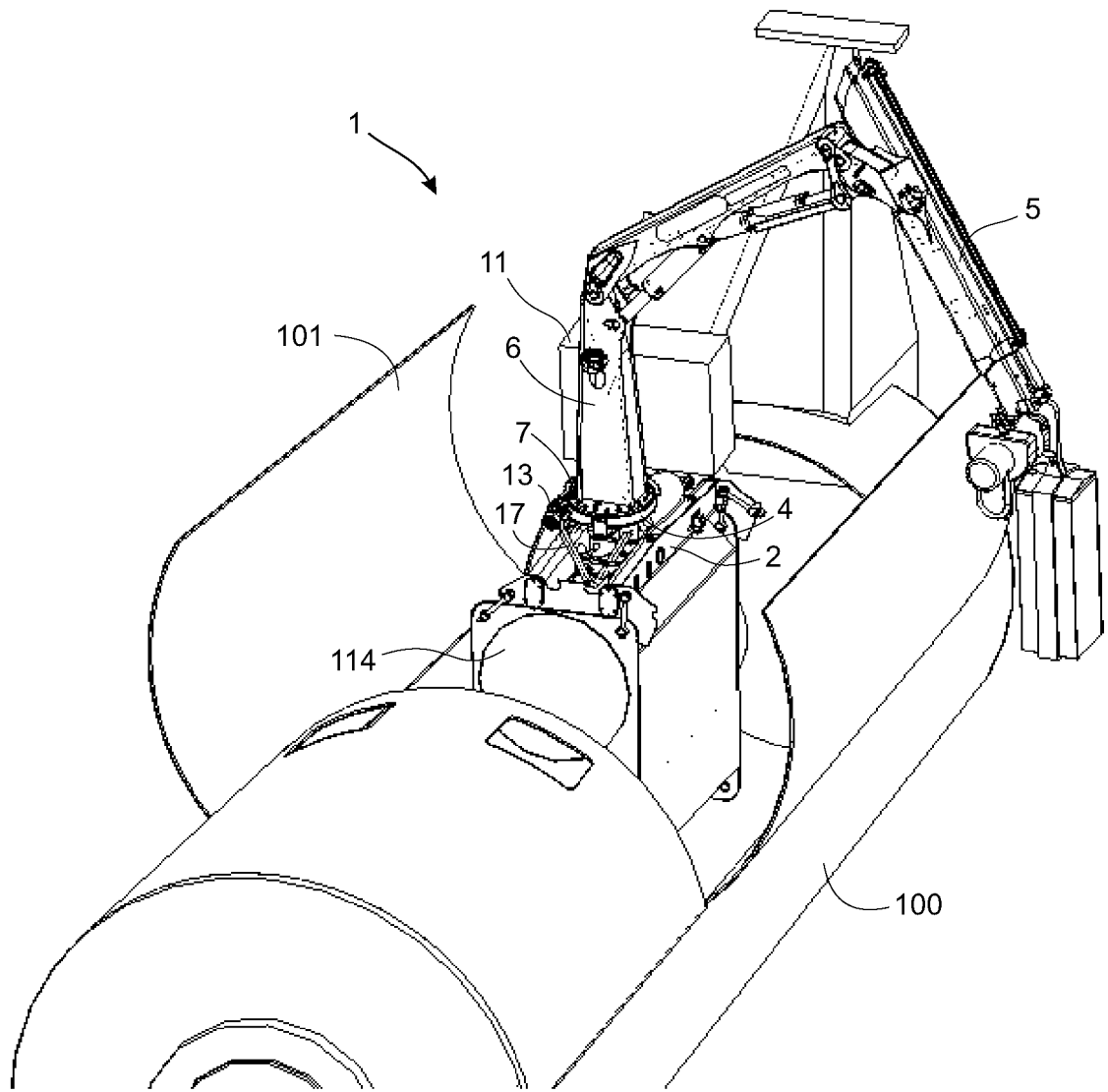
FIG. 18 depicts a front perspective view of the lift system of FIG. 17 showing the knuckle boom swiveled into a different position.
Figure 19:
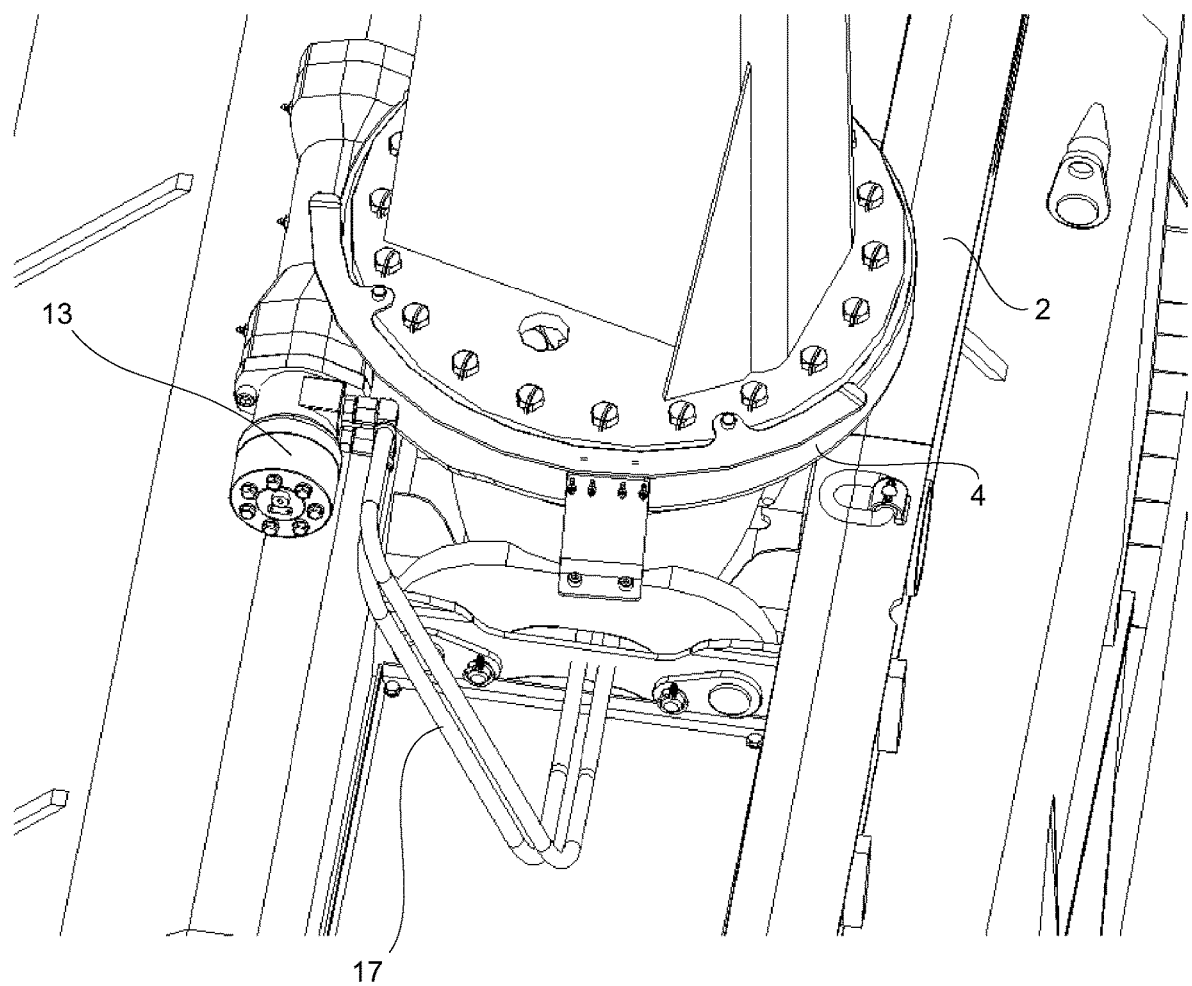
FIG. 19 depicts a magnified view of the mounting interface with the knuckle boom mounted thereon.
Figure 20:
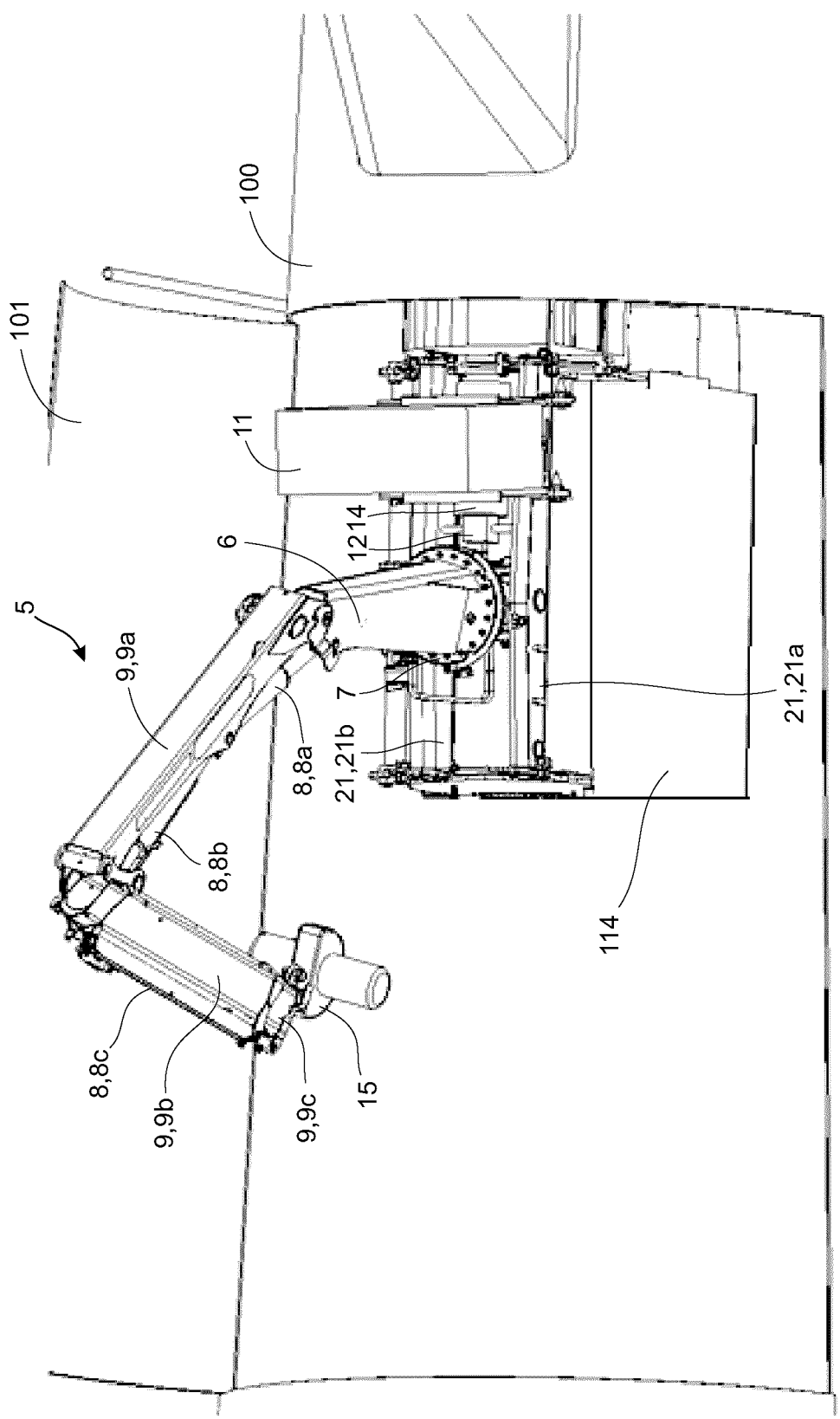
FIG. 20 depicts the lift system of FIG. 17 with the knuckle boom deployed in a fully retracted configuration.
Figure 21:
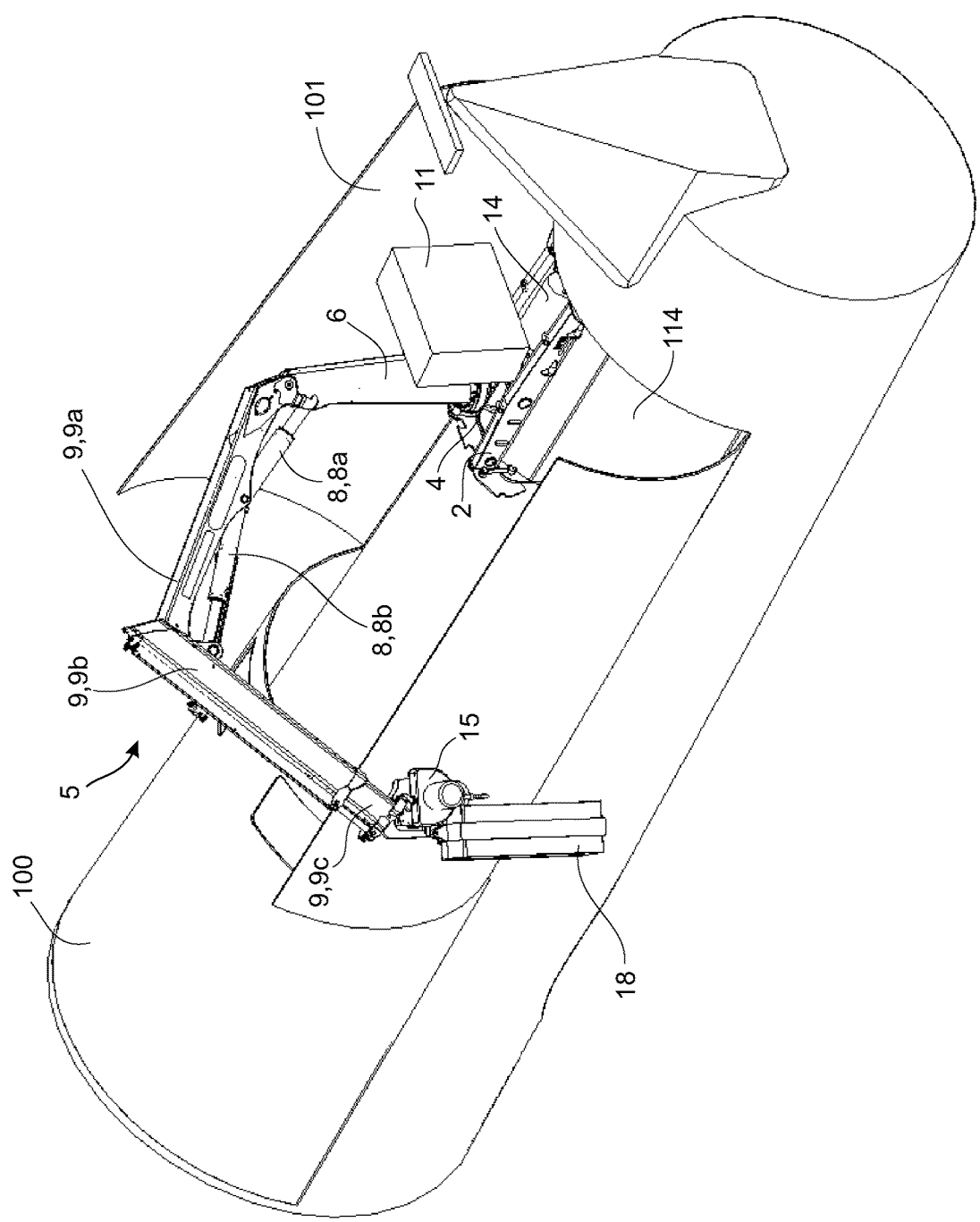
FIG. 21 depicts the lift system of FIG. 20 with the knuckle boom partially extended.
Figure 22:
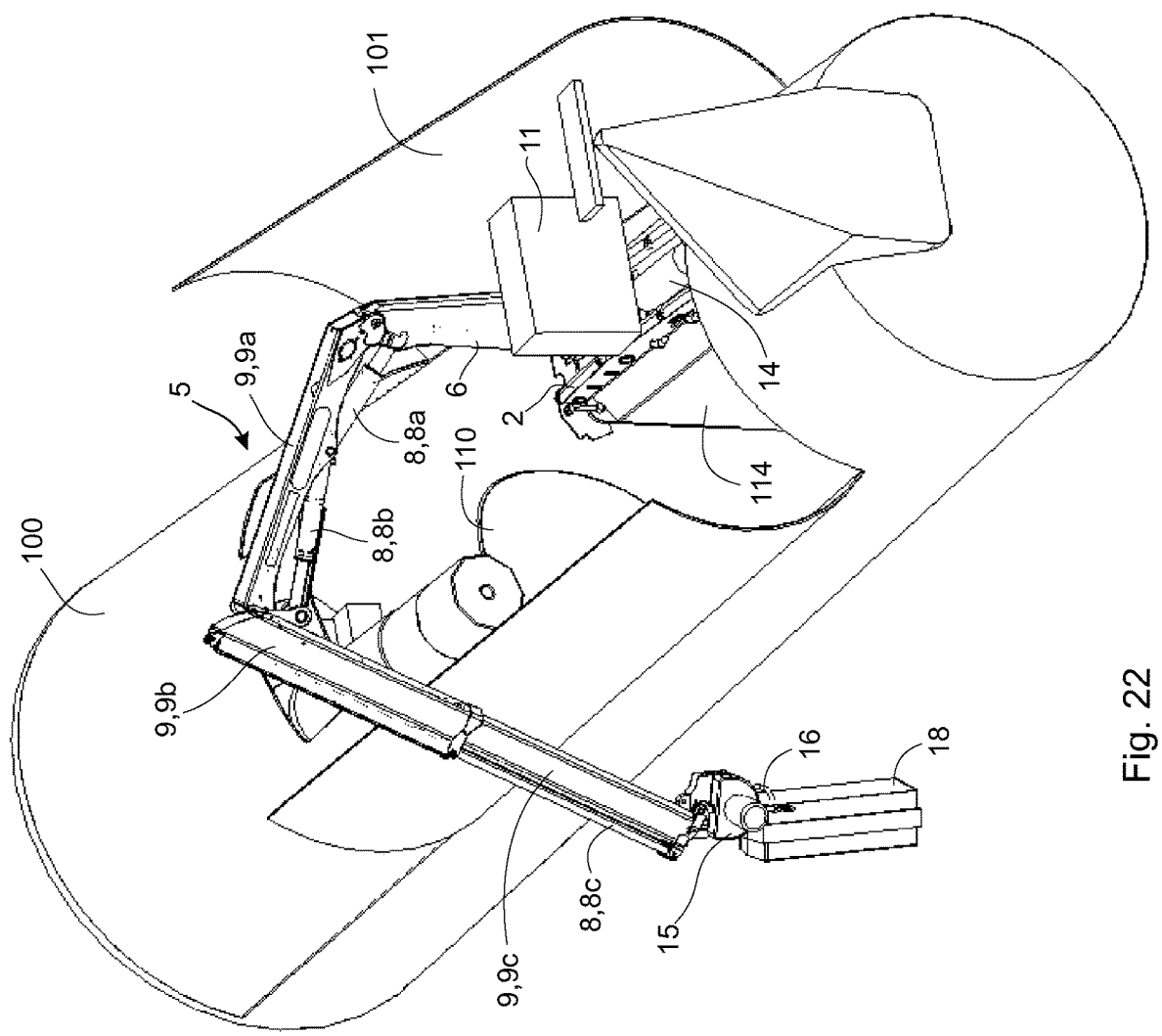
FIG. 22 depicts the lift system of FIG. 20 with the knuckle boom fully extended.
Figure 23:
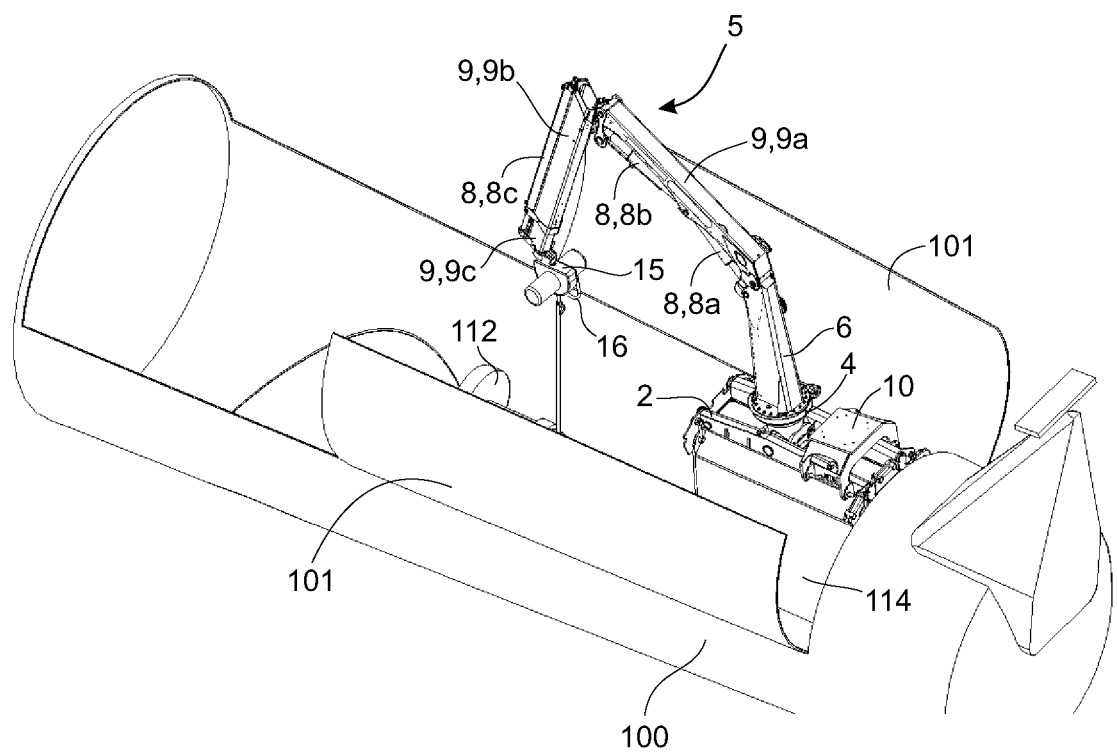
FIG. 23 depicts the lift system of FIG. 17 lifting an intermediate speed (IMS) shaft inside the nacelle of the wind turbine.
Figure 24:
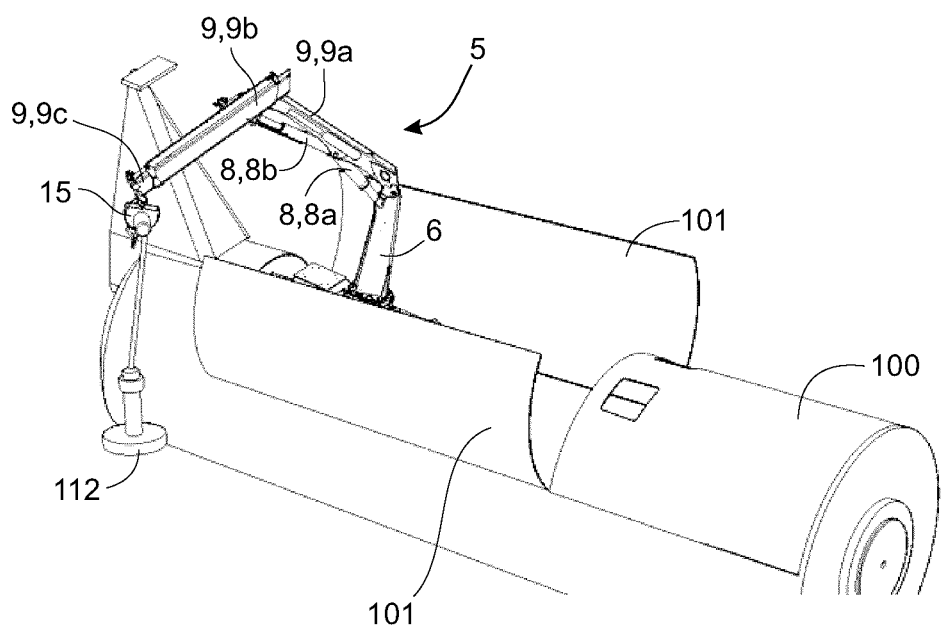
FIG. 24 depicts the lift system of FIG. 23 deploying the IMS shaft outside the nacelle for lowering the shaft to the ground; and, FIG. 25 depicts the IMS shaft being lowered to the ground by the lift system.
Figure 25:
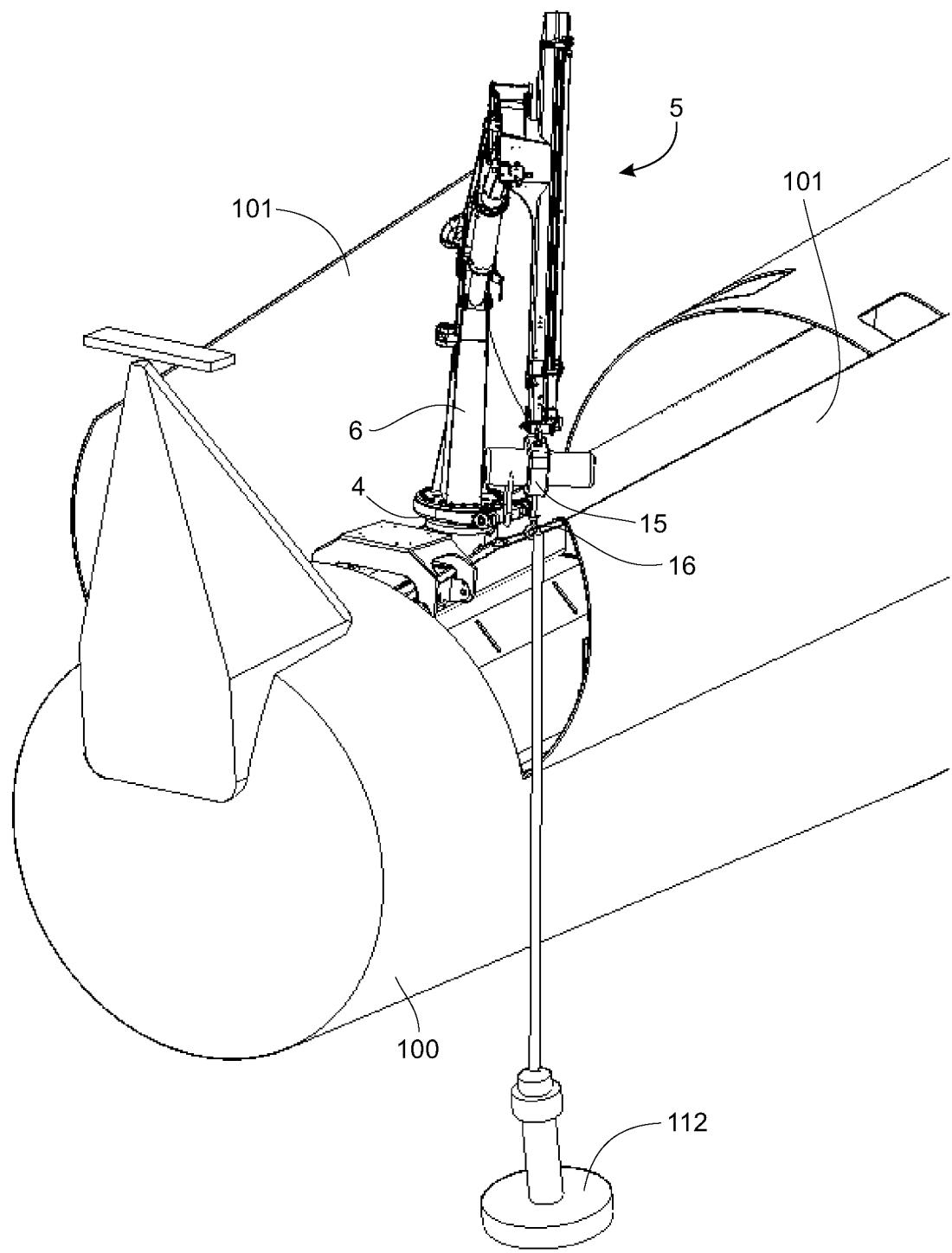

With specific reference to FIG. 18 to FIG. 20, the power pack (including the hydraulic pump 12 and the electric motor 14) is mounted on the mounting interface 2 proximate the swivel 4 and the support bracket 10 in order to locate the power pack close to the hydraulic components on the swivel 4 and the knuckle boom 5, and close to the control unit 11 to reduce the length of the hydraulic lines 17 and electrical lines (not shown) required to connect the power pack to the various hydraulic and electrical components of the lift system 1. The hydraulic motor 13 is mounted on the swivel 4, and accompanies the swivel 4 when the swivel 4 is dismounted from the mounting interface 2. The power pack is positioned so that the power pack, including the hydraulic pump 12 and the electric motor 14, does not extend significantly above the height of the mounting interface 2, thereby ensuring sufficient clearance above the mounting interface 2 to be able to close the clamshell doors 101 of the nacelle 100 without needing to dismount the mounting interface 2 from the generator 114 (see FIG. 16).

Quick connect power fittings (hydraulic and electrical) and the pin arrangements for mounting the swivel 4 and the support bracket 10 on the mounting interface 2 provide modularity to the lift system 1, which advantageously permits rapidly dismounting various components of the lift system 1 and closing the nacelle 100 in emergency situations, for example in inclement weather, while the mounting interface 2, with the power pack, remains mounted on the generator 114. When the emergency is over, the nacelle 100 can be re-opened and the various components can be rapidly remounted.

With specific reference to FIG. 20 to FIG. 25, the knuckle boom 5 comprises the base plate 7, the pedestal 6 and the articulated boom arm 9. The knuckle boom 5 is attached to the swivel 4 by base plate 7, and the pedestal 6 is vertically oriented and rigidly attached to the base plate 7. The articulated boom arm 9 comprises a first boom section 9a pivotally mounted to the pedestal 6 at or proximate a proximal end of the first boom section 9a. The articulated boom arm 9 further comprises a second boom section 9b pivotally mounted to the first boom section 9a at or proximate a distal end of the first boom section 9a and at or proximate a proximal end of the second boom section 9b. The articulated boom arm 9 further comprises a third boom section 9c translatably mounted alongside the second boom section 9b.

The swivel 4 permits rotation of the knuckle boom 5 around a full 360° circle in a horizontal plane so that the knuckle boom 5 can operate within and outside the nacelle 100, and can operate on all sides of the nacelle 100. Actuators 8, individually labeled as 8a, 8b and 8c, control pivoting and translation of the articulated boom 9. The actuators 8a, 8b, 8c may be any suitable actuators or combination of actuators, for example hydraulic cylinders, linear actuators, pneumatic cylinders, screw actuators, etc. The actuator 8a controls pivoting of the first boom section 9a in a vertical plane. The actuator 8b controls pivoting of the second boom section 9b in a vertical plane. The actuator 8c controls translation of the third boom section 9c in a direction in which the second boom section 9b is pointing. Thus, operation of the actuator 8c effectively increases and decreases the reach of the knuckle boom 5 by extending and retracting the third boom section 9c, which slides alongside the second boom section 9b relative to the second boom section 9b. While the second boom section 9b is pivotable on the first boom section 9a, which affects the reach of the second boom section 9b, the second boom section 9b does not slide. Using the translatable third boom section 9c to further increase and decrease the reach of the knuckle boom 5 is convenient for operators working on the gearbox 110, which is located some distance from the generator 114. The knuckle boom 5 described above provides the required reach, while staying within an acceptable weight limitation for the knuckle boom 5.

Each of the modular components of the lift system 1 are sized to be lifted by the existing service crane on the wind turbine. Disassembly points and overall weight of each modular component are carefully selected in view of a lifting procedure for raising the entire lift system 1 up to the nacelle 100 where the lift system 1 is assembled. The procedure for raising the lift system 1 up to the nacelle 100 comprises:

1. opening the clamshell doors 101 and erecting the existing service crane;
2. using the existing service crane to lift an intermediate lifting hoist, which extends the capacity of the service crane cable from 250 kg to 1000 kg;
3. lifting the mounting interface 2 with the power pack and swivel 4 thereon using the service crane and intermediate hoist, and mounting the mounting interface 2 on the generator 114 in the nacelle 100;
4. lifting the knuckle boom 5 using the service crane and intermediate hoist, and mounting the base plate 7 to the swivel 4;
5. lifting the chain hoist 15 using the service crane and intermediate hoist, and mounting the chain hoist 15 to the knuckle boom 5;
6. lifting the support bracket 10 with the control unit 11 thereon using the service crane and intermediate hoist, and mounting the support bracket 10 on the mounting interface 2;
7. connecting the control unit 11 to the electric motor 14 in the power pack; and,
8. optionally lowering the existing service crane to its normal location within the nacelle 100, if it is not anticipated that it will be required for inclement weather.

The lift system 1 allows a single crane to be used to raise and lower an upper housing of the gearbox 110, to lift and lower a canopy of the nacelle 100 and to lift and lower gearbox components, due, at least in part, to the longer reach provided by the knuckle boom 5 with the translating third boom section 9c, the greater lift capacity and the sufficiently low weight that the lift system 1 can be raised up to the nacelle 100 using the limited existing service crane.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A lift system mountable in a nacelle of a wind turbine, the lift system comprising:
   a mounting interface removably securable to a generator in the nacelle of the wind turbine, the mounting interface comprising a first plurality of through apertures;
   a swivel removably mounted on the mounting interface, the swivel comprising a second plurality of through apertures each concentrically aligned with one through aperture of the first plurality of through apertures when the swivel is mounted on the mounting interface, the swivel secured to the mounting interface by a plurality of non-threaded pins removably inserted through the concentrically aligned through apertures of the first and second plurality of through apertures, the removable non-threaded pin permitting mounting of the swivel on and dismounting of the swivel from the mounting interface;
   a knuckle boom rotatably mounted on the swivel, the knuckle boom rotatable on the swivel about a vertical axis, the knuckle boom comprising an extendable boom arm, the extendable boom arm comprising a translatable boom section slidably mounted on the boom arm;

a power pack mounted on the mounting interface, the power pack comprising an electric motor and a hydraulic pump, the power pack not extending beyond a maximum height to permit closing the nacelle when the mounting interface is mounted on the generator and the knuckle boom is dismounted from the mounting interface; and, a hydraulic motor for operating the swivel, the hydraulic motor connectable to the hydraulic pump by hydraulic lines and quick connect hydraulic fittings.

2. The lift system of claim 1, further comprising a support bracket removably mounted on the mounting interface, the support bracket adapted to securely support a control unit thereon.

3. The lift system of claim 2, wherein the support bracket and the mounting interface comprise mated through apertures that receive removable mounting pins to mount the support bracket on the mounting interface.

4. The lift system of claim 1, wherein doors of the nacelle may be completely closed when the knuckle boom is dismounted and the mounting interface remains mounted on the generator.

5. The lift system of claim 1, wherein the knuckle boom is able to lift an upper housing of a gearbox of the wind turbine.

6. A lift system mountable in a nacelle of a wind turbine, the lift system comprising:
a mounting interface removably securable to a generator in the nacelle of the wind turbine, the mounting interface comprising clamps that engage protruding elements of the generator to securely and removably mount the mounting interface on a top of the generator; and,
a knuckle boom rotatably and removably mounted on the mounting interface, the knuckle boom comprising an extendable boom arm, the extendable boom arm comprising a translatable boom section slidably mounted on the boom arm,
wherein the lift system further comprises a swivel removably mounted on the mounting interface, the knuckle boom rigidly mounted on the swivel, the swivel rotatable to rotate the knuckle boom mounted thereon about a vertical axis, wherein:
the swivel comprises a rotatable portion on which the knuckle boom is mounted and a fixed portion comprising a first through aperture;
the mounting interface comprises a second through aperture concentrically aligned with the first through aperture when the swivel is mounted on the mounting interface; and,
the swivel is secured to the mounting interface by a non-threaded pin removably inserted through the first and second through apertures, the removable non-threaded pin permitting mounting of the swivel on and dismounting of the swivel from the mounting interface.

7. The lift system of claim 6, wherein the first through aperture, the second through aperture and the removable non-threaded pin comprise a plurality of first through apertures, second through apertures and removable non-threaded pins.

8. The lift system of claim 6, wherein the mounting interface further comprises a third through aperture through which a support pin is inserted, the swivel comprising a support surface having an indent in which the support pin is engaged so that the swivel rests on the support pin when the swivel is mounted on the mounting interface.

9. The lift system of claim 8, wherein the third through aperture and the support pin comprise a plurality of third through apertures and support pins.

10. The lift system of claim 6, further comprising a hydraulic motor for operating the swivel.

11. The lift system of claim 10, further comprising a power pack comprising a hydraulic pump and an electric motor for operating the hydraulic pump, the hydraulic pump connectable to the hydraulic motor through hydraulic lines and quick connect hydraulic fittings.

12. The lift system of claim 11, wherein the power pack is mounted on the mounting interface and does not extend beyond a maximum height to permit closing the nacelle when the mounting interface is mounted on the generator and the knuckle boom is dismounted from the mounting interface.

13. The lift system of claim 6, wherein the mounting interface comprises one or more hydraulic fluid reservoirs.

14. The lift system of claim 13, wherein the one or more hydraulic fluid reservoirs is one or more hollow side rails of the mounting interface in fluid communication with a hydraulic pump mounted on the mounting interface.

15. The lift system of claim 6, wherein the clamps comprise hooking portions that engage the protruding elements, and further comprise bolts for tightening the clamps on the generator.

16. A lift system mountable in a nacelle of a wind turbine, the lift system comprising:
a mounting interface removably securable to a generator in the nacelle of the wind turbine;
a swivel removably mounted on the mounting interface; and,
a knuckle boom rigidly mounted on the swivel, the swivel rotatable to rotate the knuckle boom mounted thereon about a vertical axis, the knuckle boom comprising an extendable boom arm, the extendable boom arm comprising a translatable boom section slidably mounted on the boom arm, the knuckle boom able to lift an upper housing of a gearbox of the wind turbine,
wherein:
the swivel comprises a rotatable portion on which the knuckle boom is mounted and a fixed portion comprising a first through aperture;
the mounting interface comprises a second through aperture concentrically aligned with the first through aperture when the swivel is mounted on the mounting interface; and
the swivel is secured to the mounting interface by a non-threaded pin removably inserted through the first and second through apertures, the removable non-threaded pin permitting mounting of the swivel on and dismounting of the swivel from the mounting interface.

17. The lift system of claim 16, wherein the mounting interface comprises clamps that engage protruding elements of the generator to securely and removably mount the mounting interface on a top of the generator.

\* \* \* \* \*